(12) United States Patent  
Hughes

(10) Patent No.: US 8,774,362 B2
(45) Date of Patent: *Jul. 8, 2014

(54) SYSTEMS AND METHODS FOR IMPROVING DIRECTED PEOPLE SCREENING

(75) Inventor: Ronald J. Hughes, Garden Grove, CA (US)

(73) Assignee: Rapiscan Systems, Inc., Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/471,693

(22) Filed: May 15, 2012

(65) Prior Publication Data

US 2012/0288063 A1   Nov. 15, 2012

Related U.S. Application Data

(63) Continuation of application No. 12/142,978, filed on Jun. 20, 2008, now Pat. No. 8,199,996.

(60) Provisional application No. 60/945,383, filed on Jun. 21, 2007.

(51) Int. Cl.
*G01N 23/203* (2006.01)
*G06K 9/36* (2006.01)

(52) U.S. Cl.
USPC ............... 378/87; 378/88; 378/89; 378/90; 382/132

(58) Field of Classification Search
USPC ............ 378/57, 87, 88, 89, 90; 382/131, 132
See application file for complete search history.

(56) References Cited

U.S. PATENT DOCUMENTS

| | | | |
|---|---|---|---|
| 3,678,278 | A | 7/1972 | Peil |
| 3,780,291 | A | 12/1973 | Stein et al. |
| 3,790,799 | A | 2/1974 | Stein et al. |
| 3,843,881 | A | 10/1974 | Barton, Jr. et al. |
| 3,884,816 | A | 5/1975 | Takahashi |
| RE28,544 | E | 9/1975 | Stein et al. |
| 3,919,467 | A | 11/1975 | Peugeot |
| 3,924,064 | A | 12/1975 | Nomura et al. |
| 4,020,346 | A | 4/1977 | Dennis |
| 4,031,545 | A | 6/1977 | Stein et al. |
| 4,047,035 | A | 9/1977 | Dennhoven et al. |
| 4,070,576 | A | 1/1978 | Cobb |
| 4,112,301 | A | 9/1978 | Annis et al. |
| 4,139,771 | A | 2/1979 | Dennhoven et al. |
| 4,160,165 | A | 7/1979 | McCombs et al. |
| 4,179,100 | A | 12/1979 | Sashin et al. |

(Continued)

OTHER PUBLICATIONS

International Search Report for PCT/US2008/067619, Aug. 20, 2008, Rapiscan Security Products.

(Continued)

*Primary Examiner* — Allen C. Ho
(74) *Attorney, Agent, or Firm* — Novel IP

(57) ABSTRACT

The present invention is a system and method for screening subjects at security locations while preserving the privacy of subjects and retaining the efficiency and thus, throughput, of the screening process. More specifically, the present invention is an improved X-ray detection system and method that allows for maximum threat detection performance with improved verbal and visual communication between the screening and imaging system operator and an image analyst, either proximally or remotely located, thus allowing for an accurate, directed physical search and minimal "pat-down" of subjects under inspection.

18 Claims, 27 Drawing Sheets

(56) References Cited

U.S. PATENT DOCUMENTS

| | | |
|---|---|---|
| 4,196,352 A | 4/1980 | Berninger et al. |
| 4,200,800 A | 4/1980 | Swift |
| 4,228,353 A | 10/1980 | Johnson |
| 4,228,357 A | 10/1980 | Annis |
| 4,242,583 A | 12/1980 | Annis et al. |
| 4,242,588 A | 12/1980 | Silk et al. |
| 4,260,898 A | 4/1981 | Annis |
| 4,298,800 A | 11/1981 | Goldman |
| 4,303,830 A | 12/1981 | Heinzelmann et al. |
| 4,342,914 A | 8/1982 | Bjorkholm |
| 4,349,739 A | 9/1982 | Annis |
| 4,366,382 A | 12/1982 | Kotowski |
| 4,366,576 A | 12/1982 | Annis |
| 4,389,729 A | 6/1983 | Stein |
| 4,414,682 A | 11/1983 | Annis et al. |
| 4,422,177 A | 12/1983 | Mastronardi et al. |
| 4,426,721 A | 1/1984 | Wang |
| 4,454,605 A | 6/1984 | DeLucia |
| 4,472,822 A | 9/1984 | Swift |
| 4,503,332 A | 3/1985 | Annis |
| 4,514,691 A | 4/1985 | De Los Santos et al. |
| 4,535,245 A | 8/1985 | Zonneveld et al. |
| 4,549,307 A | 10/1985 | Macovski |
| 4,586,441 A | 5/1986 | Zekich |
| 4,598,415 A | 7/1986 | Luccio et al. |
| 4,672,837 A | 6/1987 | Cottrell, Jr. |
| 4,711,994 A | 12/1987 | Greenberg |
| 4,736,401 A | 4/1988 | Donges et al. |
| 4,756,015 A | 7/1988 | Doenges et al. |
| 4,759,047 A | 7/1988 | Donges et al. |
| 4,768,214 A | 8/1988 | Bjorkholm |
| 4,783,794 A | 11/1988 | Dietrich |
| 4,799,247 A | 1/1989 | Annis et al. |
| 4,807,637 A | 2/1989 | Bjorkholm |
| 4,809,312 A | 2/1989 | Annis |
| 4,817,121 A | 3/1989 | Shimizu et al. |
| 4,819,256 A | 4/1989 | Annis et al. |
| 4,821,023 A | 4/1989 | Parks |
| 4,825,454 A | 4/1989 | Annis et al. |
| 4,839,913 A | 6/1989 | Annis et al. |
| 4,841,555 A | 6/1989 | Doi et al. |
| 4,845,769 A | 7/1989 | Burstein et al. |
| 4,864,142 A | 9/1989 | Gomberg |
| 4,870,670 A | 9/1989 | Geus |
| 4,884,289 A | 11/1989 | Glockmann et al. |
| 4,890,310 A | 12/1989 | Umetani et al. |
| 4,893,015 A | 1/1990 | Kubierschky et al. |
| 4,894,619 A | 1/1990 | Leinonen et al. |
| 4,899,283 A | 2/1990 | Annis |
| 4,974,247 A | 11/1990 | Friddell |
| 4,979,137 A | 12/1990 | Gerstenfeld et al. |
| 5,007,072 A | 4/1991 | Jenkins et al. |
| 5,022,062 A | 6/1991 | Annis |
| 5,033,073 A | 7/1991 | Friddell |
| 5,039,981 A | 8/1991 | Rodriguez |
| 5,044,002 A | 8/1991 | Stein |
| 5,084,619 A | 1/1992 | Pfeiler et al. |
| 5,115,459 A | 5/1992 | Bertozzi |
| 5,121,105 A | 6/1992 | Aittoniemi |
| 5,127,030 A | 6/1992 | Annis et al. |
| 5,132,995 A | 7/1992 | Stein |
| 5,156,270 A | 10/1992 | Kachel et al. |
| 5,179,581 A | 1/1993 | Annis |
| 5,181,234 A | 1/1993 | Smith |
| 5,182,764 A | 1/1993 | Peschmann et al. |
| 5,224,144 A | 6/1993 | Annis |
| 5,243,693 A | 9/1993 | Maron |
| 5,247,561 A | 9/1993 | Kotowski |
| 5,253,283 A | 10/1993 | Annis et al. |
| 5,260,982 A | 11/1993 | Fujii et al. |
| 5,313,511 A | 5/1994 | Annis et al. |
| 5,367,552 A | 11/1994 | Peschmann |
| 5,397,986 A | 3/1995 | Conway et al. |
| 5,420,905 A | 5/1995 | Bertozzi |
| 5,463,224 A | 10/1995 | Burstein et al. |
| 5,483,569 A | 1/1996 | Annis |
| 5,490,218 A | 2/1996 | Krug et al. |
| 5,503,424 A | 4/1996 | Agopian |
| 5,524,133 A | 6/1996 | Neale et al. |
| 5,572,121 A | 11/1996 | Beswick |
| 5,579,360 A | 11/1996 | Abdel-Mottaleb |
| 5,590,057 A | 12/1996 | Fletcher et al. |
| 5,600,303 A | 2/1997 | Husseiny et al. |
| 5,600,700 A | 2/1997 | Krug et al. |
| 5,602,893 A | 2/1997 | Harding |
| 5,642,393 A | 6/1997 | Krug et al. |
| 5,642,394 A | 6/1997 | Rothschild |
| 5,660,549 A | 8/1997 | Witt, III |
| 5,666,393 A | 9/1997 | Annis |
| 5,699,400 A | 12/1997 | Lee et al. |
| 5,764,683 A | 6/1998 | Swift et al. |
| 5,796,110 A | 8/1998 | An et al. |
| 5,838,758 A | 11/1998 | Krug et al. |
| 5,882,206 A | 3/1999 | Gillio |
| 5,892,840 A | 4/1999 | Jang et al. |
| 5,966,422 A | 10/1999 | Dafni et al. |
| 5,974,111 A | 10/1999 | Krug et al. |
| 6,018,562 A | 1/2000 | Willson |
| 6,044,353 A | 3/2000 | Pugliese, III |
| 6,094,472 A | 7/2000 | Smith |
| 6,137,895 A | 10/2000 | Al-Sheikh |
| 6,151,381 A | 11/2000 | Grodzins et al. |
| 6,269,142 B1 | 7/2001 | Smith |
| 6,278,115 B1 | 8/2001 | Annis et al. |
| 6,298,603 B1 | 10/2001 | Diaz |
| 6,301,327 B1 | 10/2001 | Martens et al. |
| 6,308,644 B1 | 10/2001 | Diaz |
| 6,315,308 B1 | 11/2001 | Konopka |
| RE37,467 E | 12/2001 | Brasch et al. |
| 6,366,203 B1 | 4/2002 | Burns |
| 6,370,222 B1 | 4/2002 | Cornick, Jr. |
| 6,393,095 B1 | 5/2002 | Robinson |
| 6,459,764 B1 | 10/2002 | Chalmers et al. |
| 6,473,487 B1 | 10/2002 | Le |
| 6,484,650 B1 | 11/2002 | Stomski |
| 6,507,278 B1 | 1/2003 | Brunetti et al. |
| 6,546,072 B1 | 4/2003 | Chalmers |
| 6,552,346 B2 | 4/2003 | Verbinski et al. |
| 6,597,760 B2 | 7/2003 | Beneke et al. |
| 6,610,977 B2 | 8/2003 | Megerle |
| 6,621,888 B2 | 9/2003 | Grodzins et al. |
| 6,653,588 B1 | 11/2003 | Gillard-hickman |
| 6,665,373 B1 | 12/2003 | Kotowski et al. |
| 6,707,879 B2 | 3/2004 | McClelland et al. |
| 6,721,391 B2 | 4/2004 | McClelland et al. |
| 6,742,301 B1 | 6/2004 | Schwarz |
| 6,745,520 B2 | 6/2004 | Puskaric et al. |
| 6,785,360 B1 | 8/2004 | Annis |
| 6,819,109 B2 | 11/2004 | Sowers et al. |
| 6,819,241 B2 | 11/2004 | Turner et al. |
| 6,839,403 B1 | 1/2005 | Kotowski et al. |
| 6,856,667 B2 | 2/2005 | Ellengogen |
| 6,870,791 B1 | 3/2005 | Caulfield et al. |
| 6,899,540 B1 | 5/2005 | Neiderman et al. |
| 6,901,346 B2 | 5/2005 | Tracy et al. |
| 6,911,907 B2 | 6/2005 | Kelliher et al. |
| 6,965,340 B1 | 11/2005 | Baharav et al. |
| 6,967,612 B1 | 11/2005 | Gorman et al. |
| 6,970,086 B2 | 11/2005 | Nelson |
| 6,970,087 B2 | 11/2005 | Stis |
| 7,016,459 B2 | 3/2006 | Ellenbogen et al. |
| 7,053,785 B2 | 5/2006 | Akins |
| 7,092,485 B2 | 8/2006 | Kravis |
| 7,110,493 B1 | 9/2006 | Kotowski et al. |
| 7,110,925 B2 | 9/2006 | Pendergraft et al. |
| 7,185,206 B2 | 2/2007 | Goldstein |
| 7,257,189 B2 | 8/2007 | Modica et al. |
| 7,286,634 B2 | 10/2007 | Sommer, Jr. et al. |
| 7,400,701 B1 | 7/2008 | Cason |
| 7,418,077 B2 | 8/2008 | Gray |
| 7,471,764 B2 | 12/2008 | Kaval |
| 7,505,557 B2 | 3/2009 | Modica et al. |
| 7,505,562 B2 | 3/2009 | Dinca |
| 7,551,715 B2 * | 6/2009 | Rothschild et al. ............ 378/57 |

(56) References Cited

U.S. PATENT DOCUMENTS

| | | | |
|---|---|---|---|
| 7,558,370 | B2 | 7/2009 | Sommer, et al. |
| 7,561,666 | B2 | 7/2009 | Annis |
| 7,593,506 | B2 | 9/2009 | Cason |
| 7,796,394 | B2 | 9/2010 | Wang et al. |
| 7,796,733 | B2 | 9/2010 | Hughes |
| 7,796,734 | B2 | 9/2010 | Mastronardi et al. |
| 7,809,109 | B2 | 10/2010 | Mastronardi et al. |
| 7,826,589 | B2 | 11/2010 | Kotowski et al. |
| 8,116,575 | B1 * | 2/2012 | Saisan et al. ............... 382/225 |
| 8,199,996 | B2 * | 6/2012 | Hughes ............... 382/132 |
| 2002/0045152 | A1 | 4/2002 | Viscardi et al. |
| 2003/0012338 | A1 | 1/2003 | Lienard et al. |
| 2003/0025302 | A1 | 2/2003 | Urffer, III et al. |
| 2003/0171939 | A1 | 9/2003 | Yagesh et al. |
| 2003/0214407 | A1 | 11/2003 | Sweatte |
| 2003/0225612 | A1 | 12/2003 | DeSimone et al. |
| 2003/0229506 | A1 | 12/2003 | Scott et al. |
| 2004/0051265 | A1 | 3/2004 | Nadeau |
| 2004/0088584 | A1 | 5/2004 | Shachar et al. |
| 2004/0109532 | A1 | 6/2004 | Ford et al. |
| 2004/0120454 | A1 | 6/2004 | Ellenbogen et al. |
| 2004/0175018 | A1 | 9/2004 | Macarthur et al. |
| 2005/0024199 | A1 | 2/2005 | Huey et al. |
| 2006/0262902 | A1 | 11/2006 | Wattenburg |
| 2007/0172026 | A1 | 7/2007 | Schlomka |
| 2007/0235652 | A1 | 10/2007 | Smith |

OTHER PUBLICATIONS

International Search Report for PCT/US2008/088345, Apr. 3, 2009, Rapiscan Security Products.

Rapiscan Security Products, Secure 1000 Concealed Object Detection System, Nov. 1998.

Ansi, Radiation Safety for Personnel Security Screening Systems Using X-Rays, Apr. 3, 2002.

Rapiscan Security Products, Secure 1000 Brochure, 2002.

Daniel Strom, "Screening Individuals with Backscatter X-Ray Systems", Health Physics Society, Feb. 3, 2005.

Rapiscan Systems Secure 1000 Case Study, London Heathrow Terminal 4, Fall 2004.

MSNBC, "Airports Seek Hi-Tech Security", Apr. 3, 2002.

St. Bartholomew's Hospital, Radiation Safety Report on the Rapiscan Secure 1000 X-Ray System, Nov. 4, 2004.

Gerald J. Smith, "Bodysearch Technology Uses X-ray Imaging to Remove Hazards and Humiliation from Personnel Searches", IEEE 1995.

Murray et al., "Exploitation of X-Ray Technology for the Detection of Contraband—Aviation Security Applications", European Conference on Security and Detection, Apr. 28-30, 1997.

* cited by examiner

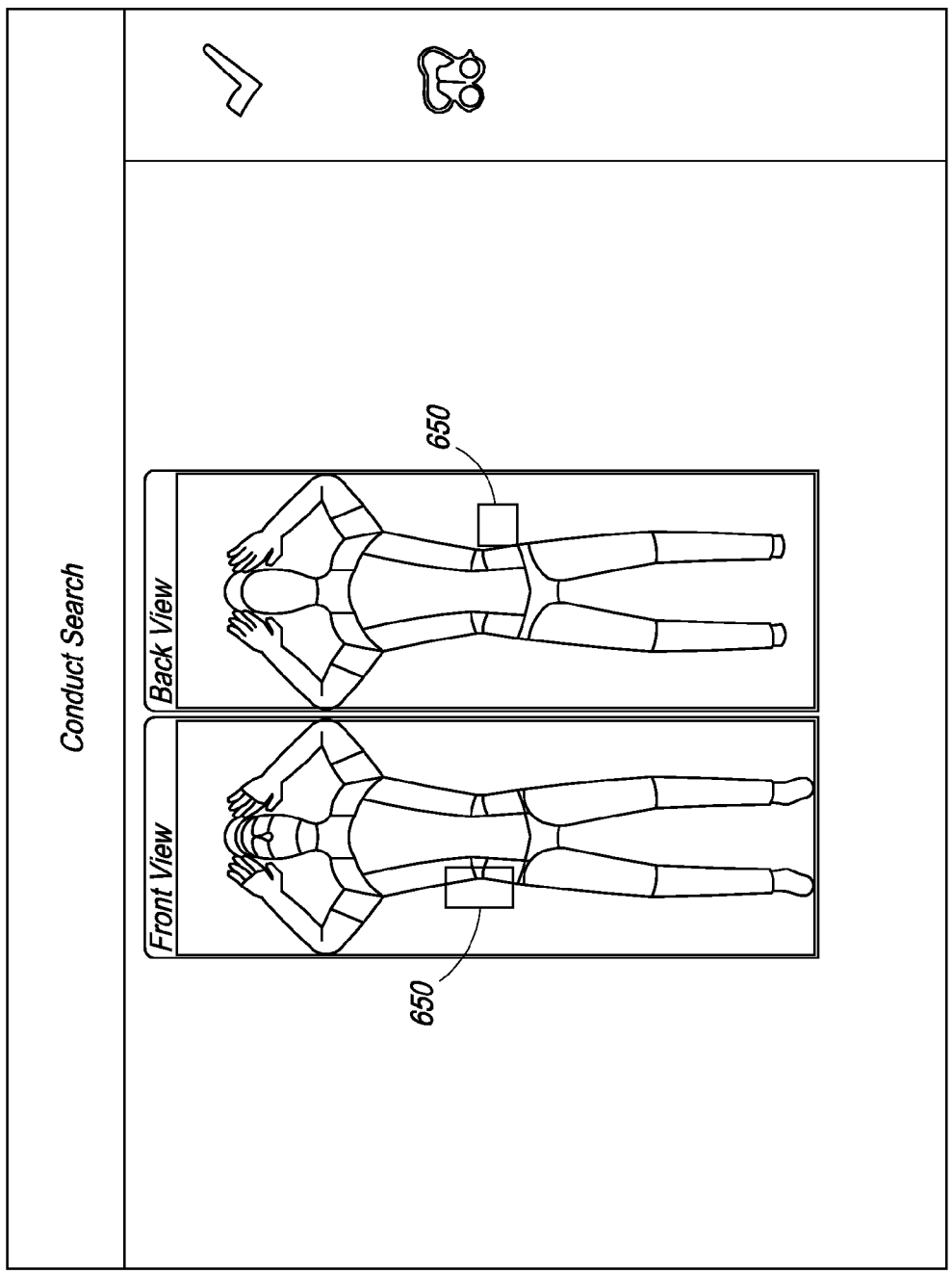

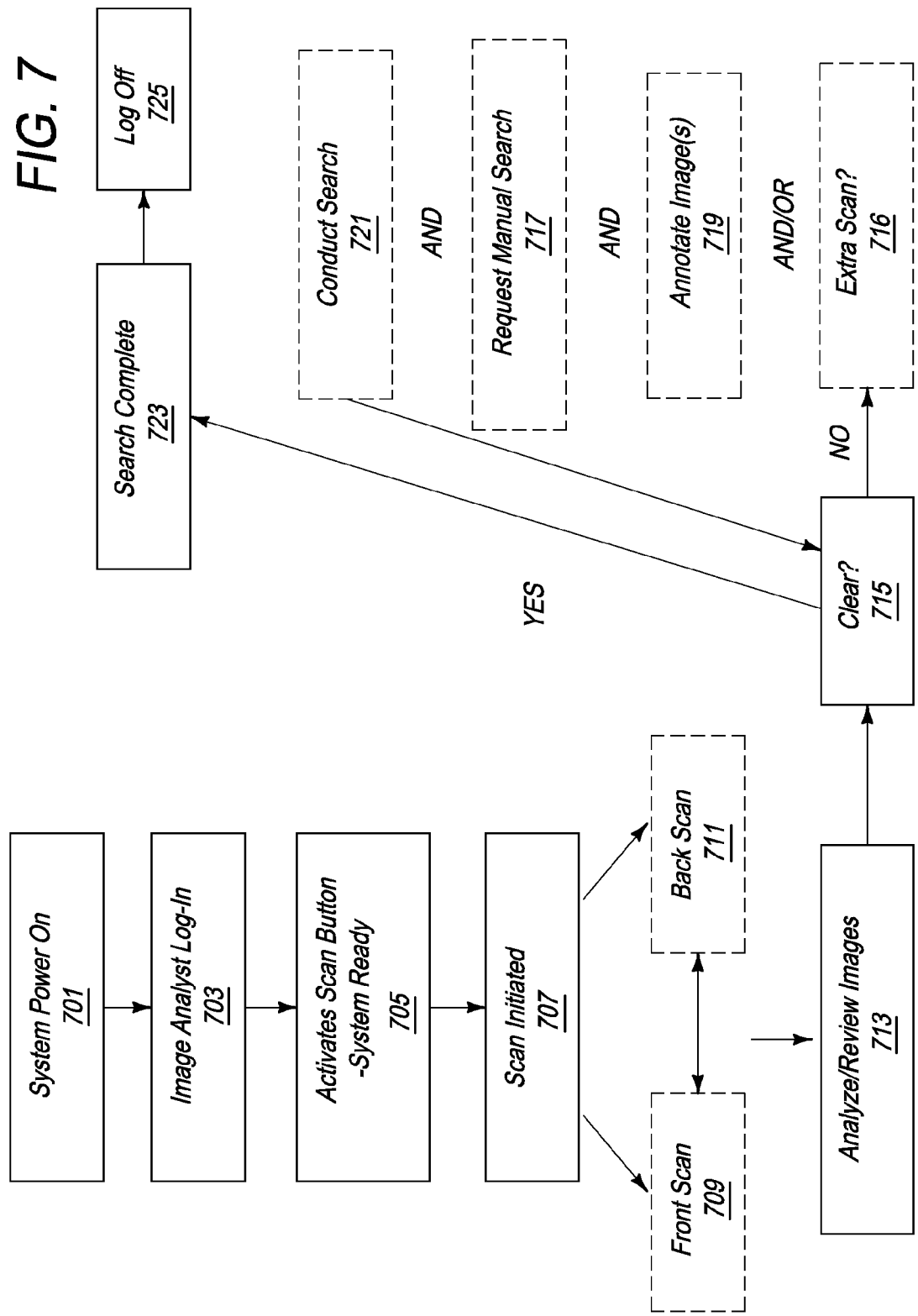

SYSTEMS AND METHODS FOR IMPROVING DIRECTED PEOPLE SCREENING

CROSS-REFERENCE TO RELATED APPLICATIONS

The present application is a continuation of U.S. patent application Ser. No. 12/142,978, filed on Jun. 20, 2008, now U.S. Pat. No. 8,199,996 B2, which relies on, for priority, U.S. Provisional Patent Application No. 60/945,383, entitled "Systems and Methods for Improving Directed People Screening" and filed on Jun. 21, 2007.

FIELD OF THE INVENTION

The present invention generally relates to the field of radiant energy imaging systems, and more specifically to systems and techniques for detecting concealed objects carried on the body of a person. In particular, the present invention relates to improved methods and systems for communicating a potential threat location between a system operator performing a search function and an image analyst. Still more particularly, the present invention relates to improved screening systems and methods for performing accurate, directed "pat-down" or physical searches of a person carrying a potential threat.

BACKGROUND OF THE INVENTION

Security systems are presently limited in their ability to detect contraband, weapons, explosives, and other dangerous objects concealed under clothing. Metal detectors and chemical sniffers are commonly used for the detection of large metal objects and certain types of explosives; however, there exists a wide range of dangerous objects that cannot be detected using these devices. Plastic and ceramic weapons increase the types of non-metallic objects that security personnel are required to detect. Manual searching of subjects is slow, inconvenient, and generally not well-tolerated by the public, especially as a standard procedure in high traffic centers, such as airports.

It is well-known to those of ordinary skill in the art that images of objects comprising various types of materials can be generated using X-ray scattering. The intensity of scattered X-rays is related to the atomic number of the material scattering the X-rays. In general, for atomic numbers less then 25, the intensity of X-ray backscatter, or X-ray reflectance, decreases as the atomic number increases.

Objects are potentially visible in X-ray images of persons due to the difference in X-ray reflectance between the objects and human tissue. Non-metallic objects are commonly composed of low atomic number elements similar to those of human tissue, i.e. hydrogen, carbon, nitrogen, and oxygen. Soft human tissue scatters a significant amount of X-rays due to the relatively low atomic number of hydrogen, carbon, and oxygen in relatively high concentration. Due to the high atomic number of calcium, bones near the surface of the body, comprised mainly of calcium, produce much less scatter. Concealed objects, especially metals, can be easily visualized in the images due to their significant difference in atomic composition from the background of human tissue.

Further, objects having similar atomic composition as the human body tend to present contours and edges when hidden underneath clothing or on the surface of the subject's body. Particularly, X-ray scattering is reduced around contours and edges due to the contours and edges absorbing scatter on one side of the edge and increasing scatter on the other side of the edge.

In conventional systems, especially of the X-ray transmission type, an operator is required to identify very low contrast objects in the presence of image clutter resulting from the imaging of internal human anatomy. The difficulty of this task results in poor detection capability for a wide range of dangerous objects composed of low atomic number elements, such as plastics or ceramics, which are often masked by the low atomic number elements which comprise the human body.

Edge detection effects or contour effects may be used for automatically and uniformly enhancing the image edges of low atomic number concealed objects to facilitate their detection. Edge enhancement is provided while simultaneously suppressing the edges of internal anatomy that produce confusion in image interpretation.

Radiant energy imaging systems for detecting concealed objects have been disclosed in the prior art. For example, U.S. Pat. No. RE28544, assigned to AS&E, Inc, discloses "a radiant energy imaging apparatus, comprising: a source of a pencil beam of X-ray radiant energy; radiant energy detecting means defining a curve in fixed relationship to said source; means for scanning with said pencil beam said radiant energy detecting means along said curve to provide an image signal representative of the radiant energy response of the medium in a region traversed by said pencil beam along a path to said detecting means; means for relatively displacing said region and an assembly comprising said source and said detecting means to establish relative translating motion in a direction transverse to a line joining said source and said detecting means to produce a sequence of image signals representative of the radiant energy response of said region in two dimensions; and means responsive to said image signals for producing an image representative of said response." The X-ray potential, however, is set at up to 150 Kilovolts and is specifically chosen to transmit X-rays through the person being examined. Operation of the X-ray tube at 150 Kilovolts or even at 100 Kilovolts would negate benefits of imaging by backscatter detection, e.g., low dose scanning. This technique requires the subject to be exposed to a substantial radiation dosage, especially if the subject is scanned often, e.g., a frequent airport traveler.

U.S. Pat. No. 4,839,913, also assigned to AS&E, Inc, describes "an apparatus useful in imaging for inspecting objects to highlight targeted components of selected radiation signature comprising: (a) a source of penetrating radiation selected to object, (b) means for repeatedly scanning a pencil beam of radiation, from said source along a line in space, (c) means providing relative motion between said object to be imaged and said line in space, (d) first radiation energy detector means located to be responsive to radiant energy penetrating said object and emerging from said object, substantially unchanged in direction, for producing first electrical signals, (e) second radiant energy detector means responsive to a predetermined fluorescent radiation line emitted from said targeted components of said object for generating second electrical signals, (f) display means responsive to said first electrical signals for producing a shadowgraph image of said object, and (g) first means responsive to said second electrical signals for generating an indication of presence of said predetermined fluorescent radiation line." The energy level of the source, however, must be sufficient to excite a selected fluorescence radiation line so that the fluorescent radiation line has sufficient energy to escape the object. Thus, it may be necessary to expose the object to relatively high X-ray energy in order to detect certain materials, which would be unacceptable for personnel inspection systems.

In addition, U.S. Pat. No. 4,799,247, also assigned to AS&E, Inc., discloses "a projection imaging system for inspecting objects for highlighting low Z materials comprising: (a) a source of penetrating radiation, (b) means for forming radiation emitted by said source into a beam of predetermined cross-section and for repeatedly sweeping said beam across a line in space, (c) means for moving said object to be imaged relative to said source in a direction perpendicular to said line in space, (d) first radiant energy detector means located to be responsive to radiant energy penetrating said object and emerging from said object, substantially unchanged in direction, for producing first electrical signals, (e) second radiant energy detector means located further from said source than said object and responsive to radiant energy scattered by said object for producing second electrical signals, (f) third radiant energy detector means located closer to said source than said object and responsive to radiant energy scattered by said object for producing third electrical signals, (g) display means responsive to at least a pair of said electrical signals for separately, independently and simultaneously displaying said pair of electrical signals as a function of time." With the incident beam being of sufficient energy to provide both transmitted and backscattered signals, the X-ray energy must be relatively high, similar to that of the patents described above, making such a system undesirable for personnel inspection.

U.S. Pat. No. 6,965,340, assigned to Agilent Technologies, discloses "a security inspection system, comprising: a portal through which a human subject is capable of walking; a scanning panel including an array of antenna elements, each of said antenna elements being programmable with a respective phase delay to direct a beam of microwave illumination toward a target on the human subject, said antenna elements being further capable of receiving reflected microwave illumination reflected from the target; and a processor operable to measure an intensity of the reflected microwave illumination to determine a value of a pixel within an image of the human subject constructed by said processor".

U.S. Pat. No. 5,181,234, assigned to Rapiscan Security Products, discloses an X-ray imaging apparatus for detecting a low atomic number object carried by or on a human body positioned at a distance from said apparatus comprising: x-ray source for producing a pencil beam of X-rays directed toward said human body; scanning means for moving the region of intersection of said pencil beam and said human body over the surface of said human body in a scanning cycle, said scanning cycle being sufficiently short to expose said human body to a low radiation dose; a detector assembly providing a signal representative of the intensity of the X-rays scattered from said human body as a result of being scanned by said scanning means, said detector assembly being disposed on a same side of said human body as said X-ray source and having an active area with dimensions sufficient to receive a substantial portion of said scattered X-rays to provide a coefficient of variation of less than 10 percent in said signal; and display means to presenting characteristics of the detector signal to an operator; wherein said scattered X-rays are distributed across said detector to create an edge effect which enhances edges of said low atomic number object to enable detection. The contents of this patent are herein incorporated by reference in their entirety.

U.S. Pat. No. 6,094,472, also assigned to Rapiscan Security Products, describes an X-ray imaging apparatus for detecting an object carried by or on a body moving relative to the apparatus, said apparatus having an entrance and an exit, said apparatus comprising: a passageway extending at least from said entrance to said exit; at least one X-ray source having means for producing a pencil beam of X-rays directed toward said body in said passageway, said pencil beam intersecting said body at a region of intersection corresponding to a pixel having a pixel value; a scanning means disposed adjacent said at least one X-ray source for moving the region of intersection of said pencil beam and said body over a surface of said body; a tracking means for causing the scanning means to substantially track said body as it moves with respect to said apparatus from said entrance to said exit; a detector assembly for detecting an intensity of X-rays scattered from said body as a result of being scanned by said first scanning means and for generating a signal representative of the intensity of the scattered X-rays, said detector assembly comprising a plurality of detectors; and display means for presenting characteristics of the detector signal to an operator.

U.S. Pat. No. 6,967,612, assigned to Gorman, John D. et al, discloses "a system for standoff detection of human carried explosives (HCE) within an area under surveillance, comprising: an active radar system, the radar system having a radar transmitter, a radar receiver, at least one radar antenna, and a field of regard; a radar tracking control system in physical cooperation with the active radar system, wherein the field of regard of the active radar system is targeted within the area under surveillance, the area of surveillance being greater than the radar field of regard; a user interface having a video display terminal and a data input means; a computer in electrical communication with the radar system, the radar tracking control system, and the user interface, the computer having a central processing unit, a memory and computer readable program code stored in the memory, the code including: radar tracking instruction means for targeting the radar system; and HCE detection instruction means for detection of human carried explosive devices."

The abovementioned conventional systems have substantial disadvantages, however. In existing systems, detailed images are produced by characteristics of the subject's body and any object concealed under the subject's clothing. The system operator then inspects each image for evidence of concealed objects. The system operator and security personnel responsible for analyzing conventional images are thus privy to these personal anatomical details.

In addition, communication between the system operator and security personnel is often hindered due to airport noise, lack of privacy, and the presence of large amounts of people and/or equipment between the image analyst and the system operator.

Further, the communication of the exact location of a perceived threat can be confusing. For example, when indicating whether a threat is on the left or right of a subject's body, it is often difficult to communicate a common frame of reference. Thus, in order to avoid confusion or miscommunication, the image analyst and system operator often spend several minutes communicating the perceived location of the threat, which is often unreliable. In addition, the perceived location of the threat may be initially misdirected, requiring security personnel to perform a full pat-down anyway to discover the actual location of the threat, and if such threat is present.

Thus, even in instances where a physical search or "pat-down" is required on a specified portion of the body of the subject, security personnel generally perform a full body pat-down. A full body pat-down, however, is often time-consuming and uncomfortable for both the security personnel and the subject under inspection. The time consumed performing full-body pat-downs further decreases throughput, thus making the process slow and inconvenient for other subjects who are in queue for security screening.

Thus, the prior art does not provide a system that achieves the correct balance between the conflicting, yet equally important principles of maximizing security and inspection capability while retaining a sufficient level of comfort and privacy for the person under inspection by directing the "pat-down" to a specific location.

In the light of the abovementioned disadvantages, there is a need for an X-ray inspection system that allows for maximum threat detection performance with an improved communication between an image analyst and the system operator, thus allowing for a directed physical search and minimal "pat-down" of subjects under inspection.

In addition, there is a need for an X-ray inspection system that allows for higher throughput owing to enhanced verbal and visual communication between system operator and image analyst and ease of use. In addition, what is needed is a people screening system that has higher throughput, resulting in higher security and overall lower cost of operation.

SUMMARY OF THE INVENTION

It is an object of the present invention to provide systems and methods for screening subjects at security locations while preserving the privacy of subjects and retaining the efficiency and thus, throughput, of the screening process.

In one embodiment, the present invention is an improved X-ray detection system and method that allows for maximum threat detection performance with improved verbal and visual communication between the screening and imaging system operator and an image analyst, either proximally or remotely located, thus allowing for an accurate, directed physical search and minimal "pat-down" of subjects under inspection.

In another embodiment, the present invention is an image processing system comprising an imaging and scanning system and an inspector station that allows the image analyst at the inspector station, to annotate and subsequently communicate images with information indicating a more specified threat location to a screening and imaging system operator at the imaging system for an accurate, directed physical search of the subject under inspection.

More specifically, in one embodiment, the present invention is a method for improving communication efficiency in an imaging system for inspecting a human body comprising creating at least one first image of said human body using said imaging system; displaying said at least one first image of said human body on a first display; and identifying at least one region of interest of said at least one first image that requires further inspection; creating at least one second image wherein said at least one second image is a visual representation of said at least one region of interest of said at least one first image that requires further inspection; and displaying said at least one second image on a second display. In one embodiment, the at least one second image comprises a modified at least one first image, wherein the at least one first image is modified to improve inspection efficiency and to preserve privacy of the human subject.

In one embodiment, the at least one first image comprises a generic visual representation of the human body.

In one embodiment, the first display is located at an inspector station for viewing by an image analyst and the second display is located at the imaging system for viewing by a screening system operator. Preferably, the image analyst uses the first display to communicate scan information to the screening system operator at the second display.

In another embodiment, the image analyst communicates perceived threat information to the screening system operator by annotating a region of interest on said at least one first image, using a suitable indicator for communicating a perceived threat region of interest.

In another embodiment, the annotations on the region of interest on the at least one first image can be adjusted by using a software algorithm and subsequently displayed on the at least one second image.

In yet another embodiment, the annotations on the region of interest on the at least one first image can be manually adjusted by the image analyst and subsequently displayed on the at least one second image.

In still another embodiment, the at least one first image is re-sized, re-shaped, and re-positioned to correlate to an actual body size in the at least one second image.

In another embodiment, the present invention is an X-ray backscatter imaging system for inspecting a human body having enhanced visual communication comprising a radiation source capable of producing a pencil beam of X-rays toward an imaging area; a detector array for detecting X-rays that are backscattered from the pencil beam as a result of interacting with matter positioned in said image area; a first display located at an inspector station; and a second display located at the imaging system, wherein said first display is used by an image analyst for communicating scan information to a system operator via said second display.

In another embodiment, the present invention is a method for enhancing communication efficiency in an imaging system for inspecting a human body comprising generating an image representation of said body; viewing the generated image representation of said body at a first display; and communicating a visual summary of said generated image representation of said body at a second display.

In another embodiment, the present invention is a method for improving communication efficiency in an imaging system for inspecting a human body comprising positioning said body in an imaging area; operating an X-ray tube to produce a pencil beam of X-rays toward said imaging area; scanning said pencil beam of X-rays over said imaging area at a sufficiently high rate, wherein said pencil beam is of a sufficiently low dosage; detecting X-rays that are backscattered from said pencil beam as a result of interacting with matter positioned in said image area; creating at least one first image of said human body using said imaging system; displaying said at least one first image of said human body on a first display; and identifying at least one area of said at least one first image that requires further inspection; creating at least one second image wherein said at least one second image is a visual representation of said at least one area of said at least one first image that requires further inspection; and displaying said at least one second image on a second display.

In still another embodiment, the present invention is an X-ray backscatter imaging system for inspecting a human body having enhanced visual communication comprising an imaging system further comprising a radiation source capable of producing a pencil beam of X-rays toward an imaging area and a detector array for detecting X-rays that are backscattered from the pencil beam as a result of interacting with matter positioned in said image area, a first display located at an image analyst station; and a second display located at the imaging system, wherein said first display is used by an image analyst for communicating scan information to a screening system operator via said second display.

BRIEF DESCRIPTION OF THE DRAWINGS

These and other features and advantages of the present invention will be appreciated, as they become better understood by reference to the following Detailed Description when considered in connection with the accompanying drawings, wherein:

FIGS. 6A, 6B, 6C, 6D, 6E, 6F, 6G, 6H, 6I, 6J, 6K, 6L, 6M, 6N, 6O, 6P, 6Q, 6R, 6S, 6T, and 6U illustrate the operational steps of various embodiments of the screening system of the present invention; and FIG. 7 is a flow chart depicting the operational steps of the screening system of the present invention, as described with respect to FIGS. 6A-6U.

DETAILED DESCRIPTION OF THE INVENTION

Figure 1:
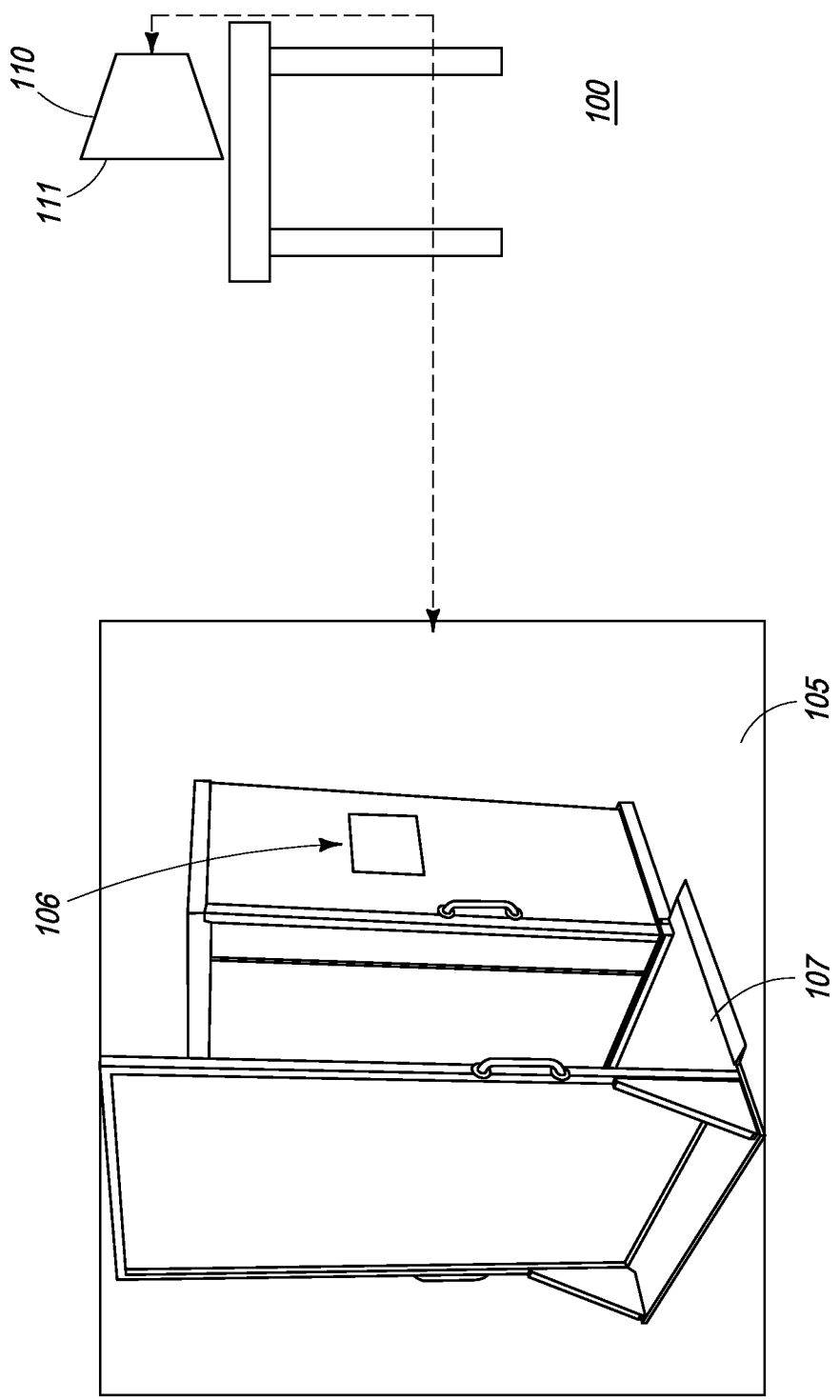
FIG. 1 is a schematic illustration of one embodiment of the layout of a security system of the present invention.

The present invention is directed towards systems and methods for screening subjects at security locations while preserving the privacy of subjects and retaining the efficiency and thus, throughput, of the screening process.

The present invention is also directed towards an improved X-ray detection system and method that allows for maximum threat detection performance with improved verbal and visual communication between the screening and imaging system operator and an image analyst, either proximally or remotely located, thus allowing for an accurate, directed physical search and minimal "pat-down" of subjects under inspection.

The present invention is also directed towards an image processing system comprising an imaging and scanning system and an inspector station that allows the image analyst at the inspector station, to annotate and subsequently communicate images with information indicating a more specified threat location to a screening and imaging system operator at the imaging system for an accurate, directed physical search of the subject under inspection.

In another embodiment, the present invention is directed towards an image processing system that employs a computer system with automatic detection algorithms and a rules-based inference engine to annotate and subsequently communicate images with information indicating a more specified threat location to a screening system operator at the imaging system for an accurate, directed physical search of the subject under inspection.

Thus, the present invention, in one embodiment, is directed towards an inspection system for inspecting a human body having enhanced visual communication comprising an imaging system further comprising a radiation source capable of producing a pencil beam of X-rays toward an imaging area and a detector array for detecting X-rays that are backscattered from the pencil beam as a result of interacting with matter positioned in said image area, a first display located at an image analyst station; and a second display located at the imaging system, wherein said first display is used by an image analyst for communicating scan information to a screening system operator via said second display.

The present invention is also directed towards an improved X-ray detection system and method that enables improved verbal and visual communication between the screening system operator and an image analyst, thus providing for a system that has high throughput, is easy to use, requires reduced training to operate, has a lower overall cost of operation, and enhances security.

The present invention is directed toward multiple embodiments. Language used in this specification should not be interpreted as a general disavowal of any one specific embodiment or used to limit the claims beyond the meaning of the terms used therein.

In one embodiment of the present invention, the image representation of the subject is viewed at an inspector station by an image analyst. In one embodiment of the present invention, the inspector station is at a location remote from the imaging system. The image analyst views the image of the subject to obtain an accurate indication of the location of potential threat objects.

In one embodiment, as mentioned above and detailed further below, the image analyst can then annotate the image and send the annotated image information to a display located at the imaging system to direct a physical search to a specific location on the subject's body in which a threat may be located.

In one embodiment of the present invention, data is transmitted between the image analyst at the inspector station and the screening system operator at the imaging system.

In one embodiment, the transmitted data represents an image representation of the subject under inspection. In another embodiment, the transmitted data represents an image representation of the subject under inspection, wherein the image analyst includes annotations indicating a directed area on the subject under inspection that may require a physical search by the system operator. In another embodiment, the transmitted data represents a highly privatized, generic outline image representation of the subject under inspection. In another embodiment, the transmitted data represents a highly privatized, generic outline image representation of the subject under inspection, wherein the image analyst includes annotations indicating a directed area on the subject under inspection that may require a physical search by the screening system operator. Several embodiments of the present invention will be described in greater detail below with respect to FIGS. 6A, 6B, 6C, 6D, 6E, 6F, 6G, 6H, 6I, 6J, 6K, 6L, 6M, 6N, 6O, 6P, 6Q, 6R, 6S, 6T, and 6U, which depict the operational steps of the security inspection system of the present invention.

In one embodiment, the present invention is a concealed object detection system that utilizes low-level radiation doses to detect weapons and dangerous materials, regardless of whether they consist of metal or low-Z materials. The imaging system is configured to include a left side module and a right side module separated by a distance sufficiently wide to allow a person to walk between the two modules. A housing, which may include a ceiling, conceals the left side module and the right side module, forming a portal configuration. In addition, the portal configuration of the preferred embodiment, with its relatively confined area, is easier to combine with other people screening devices, including metal detectors, drug and explosives sniffers, and video cameras.

Reference will now be made to specific embodiments of the present invention. The embodiment described herein is not a general disavowal of any one specific embodiment or used to limit the claims beyond the meaning of the terms used therein.

FIG. 1 is a schematic illustration of one embodiment of a layout of the people screening security system of the present invention. In one embodiment, security system 100 comprises imaging system 105 and inspector station 110. In one embodiment, but not limited to such embodiment, the imaging system employed in the present invention is a concealed object detection system in which a pencil beam of X-rays is scanned over the surface of the body of a person under inspection or examination. In other embodiments, however, the radiographic image can be formed using any available radiation imaging technique for "body imaging" such as, but not limited to X-ray scattering, X-ray penetration, infrared imaging, millimeter wave imaging, RF imaging, radar imaging, holographic imaging, CT imaging, and MRI. Any "body imaging" system, as is known to those of ordinary skill in the art, that has the potential for displaying body detail may be employed. The system and apparatus of the present invention ensures that the inspection occurs with minimal invasion of privacy.

In one embodiment, the imaging system employed with the present invention can be any screening system, such as, but not limited to the people screening system described in U.S. Pat. No. 5,181,234, which is herein incorporated by reference. Thus, while the present invention is described with respect to its use in a concealed object detection system in which a pencil beam of X-rays is scanned over the surface of the body of a person under inspection or examination, the present invention is not limited to such use and the description provided herein is intended to be exemplary.

In operation, X-rays that are scattered or reflected from the subject's body, that result from the pencil beam of X-rays scanned over the surface of the body, are detected by a detector such as, for example, a scintillator and photomultiplier tube combination. The signal produced by this scattered X-ray detector is then used to produce an image representation of the subject and any concealed objects carried by the subject. The system allows the operator to detect threats by imaging explosive materials such as dynamite and C-4, as well as ceramics, graphite fibers, plastic containers, plastic weapons, glass vials, syringes, packaged narcotics, bundled paper currency, and even wooden objects.

In addition, one of ordinary skill in the art would appreciate that the features described in the present application can operate on any computing platform including, but not limited to: a laptop; personal computer; personal data assistant; cell phone; server; embedded processor; DSP chip or specialized imaging device. Additionally, the programmatic code can be compiled (whether that be pre-compiled or compiled "just-in-time") into a single application executing on a single computer, or distributed among several different computers operating locally or remotely to each other.

In one embodiment of the present invention imaging system 105 further comprises a monitor or display 106 and an inspection area 107. A screening system operator (not shown) is preferably located in front of monitor 106 to instruct the subject under inspection, to initiate the scan process using a scan initiation button or other means located on the system (not shown), and to read commands from the Graphical User Interface (GUI) on monitor 106. In one embodiment, the GUI (not shown) on monitor 106 comprises a status indicator and image representation display with limited or no actions required or allowed by the screening system operator.

In an optional embodiment, monitor 106 further comprises a touch screen. In one embodiment, the touch screen allows for the screening system operator to use a fully functional GUI.

In one embodiment, the GUI is employed to enable the display of messages, from the image analyst to the screening system operator, on scanner monitor 106. One operational embodiment of the security system of the present invention and thus, the functions provided by an exemplary GUI is discussed in greater detail below with respect to FIGS. 6A, 6B, 6C, 6D, 6E, 6F, 6G, 6H, 6I, 6J, 6K, 6L, 6M, 6N, 6O, 6P, 6Q, 6R, 6S, 6T, and 6U.

In one embodiment of the inspection and security system 100, inspector station 110 comprises monitor or display 111, further comprising a GUI (not shown) for displaying resultant image representations of the subject under inspection. In one embodiment, the GUI is employed to enable communication from the image analyst to the screening system operator via display or monitor 106. One operational embodiment of the security system of the present invention and thus, the functions provided by an exemplary GUI is discussed in greater detail below with respect to FIGS. 6A, 6B, 6C, 6D, 6E, 6F, 6G, 6H, 6I, 6J, 6K, 6L, 6M, 6N, 6O, 6P, 6Q, 6R, 6S, 6T, and 6U.

It should be noted herein and understood by those of ordinary skill in the art that both the image analyst and screening system operator can input commands to a computing system that controls the GUI and imaging system of the present invention using any type of input device, including, but not limited to a mouse, touch screen or keyboard.

In one embodiment of the present invention, inspector station 110 is remotely located with respect to imaging system 105. In one embodiment of the present invention, inspector station 110 is installed in the same building where the imaging system 105 is installed. In another embodiment of the present invention, remotely located inspector station 110 is installed in a first location, remote and separate from scanning imaging system 105, which is located in a second location.

In one embodiment of the present invention, data is transmitted to the imaging system 105 and displayed on monitor 106 and to remotely located inspector station 110 and displayed on monitor 111. Data is exchanged between the image analyst at the remotely located inspector station 110 to the screening system operator at imaging system 105. In one embodiment, the transmitted data represents an image representation of the subject under inspection. In one embodiment, the outline or image data representation of the subject is generated by the imaging system that is part of imaging system 105. In one embodiment, the outline or image data representation is generated by a backscatter imaging system, as described in greater detail below with respect to FIG. 2.

In another embodiment of the present invention, the transmitted data further comprises annotations directed towards an area on the subject under inspection that may require a physical search. In one embodiment, the image analyst located at the remote inspector station 110 annotates, on monitor 111, image representations of the subject under inspection that may require a physical search. In one embodiment, and as discussed in further detail below, the annotations may take the form of a rectangular or circular outline of a perceived threat area. In another embodiment, the annotations may comprise any suitable indicator for communicating a perceived threat region that requires further search. In another embodiment, the annotations may comprise regions of interest, or highly detailed image information. The highly detailed image information may be a portion of the raw image obtained upon scanning a subject, or may be an alternate image of the perceived threat area.

In one embodiment of the present invention, annotated data is transmitted to imaging system 105 from inspector station 110 via a wired connection. In another embodiment of the present invention, data is transmitted to imaging station 105 from inspector station 110 via a wireless connection using standard wireless communication protocols. In another embodiment of the present invention, the wireless communication protocols may be any of Bluetooth, Home RF, IrDA, IEEE 802.11 and Wireless Application Protocol specifications.

Figure 2:
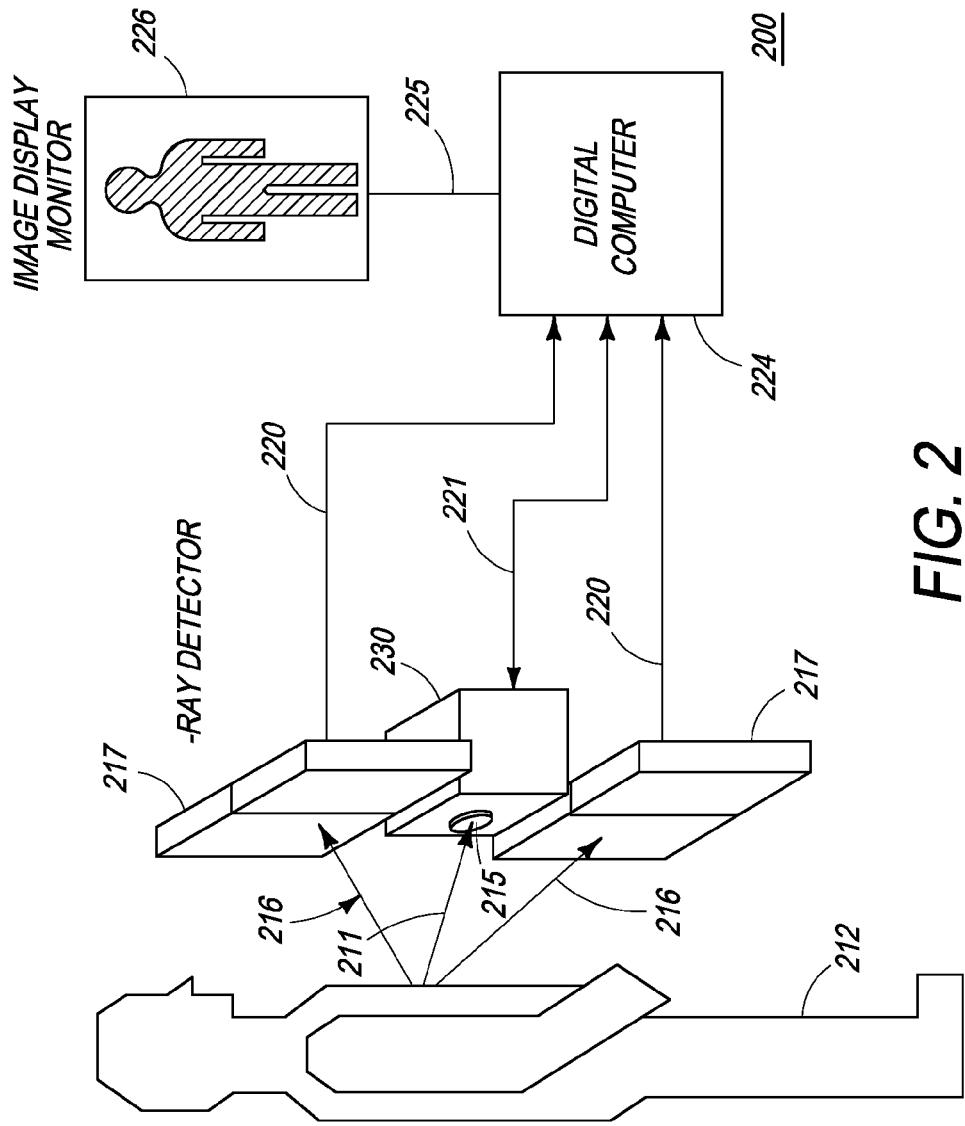
FIG. 2 is a schematic diagram of a backscatter detection system used in one embodiment of the imaging system of the present invention.

FIG. 2 is a schematic diagram of the backscatter detection system 200 used in one embodiment of the imaging system of the present invention. The backscatter detection system 200 provides a pencil beam of X-rays 211 directed at the body 212 of the person under inspection or examination. Details of the mechanical system for generating the sweeping pencil beam of X-rays are illustrated in greater detail below with reference to FIG. 3.

The pencil beam of X-rays 211 is scanned in a horizontal motion across the body under inspection 212. Scattered or reflected X-rays 216 that are scattered or reflected from the body under inspection 212 are detected by X-ray sensitive detectors 217 positioned laterally opposite and facing the subject, and on the same side as the X-ray pencil beam source 230. In one embodiment, detector panels 217 are located in the same plane as the X-ray source 230, but above and below the X-ray source 230. X-ray detectors 217 are positioned for substantially uniform X-ray detection on all sides of the incident X-ray beam. The electronic signal 220 produced from the X-ray detectors 217 and synchronization signals 221 received from the X-ray pencil beam source 230, through an aperture 215, are routed to a digital computer 224.

Digital computer 224 generates an image display 225 on a monitor 226, wherein the intensity at each point in the display corresponds to the relative intensity of the detected scattered X-rays. In one embodiment of the present invention, and as described in greater detail below, numerous graphical user interface screens are presented on both the imaging system monitor and inspector station monitor, which enable effective communication between the two stations and efficient search and scanning of the subjects.

Figure 3:
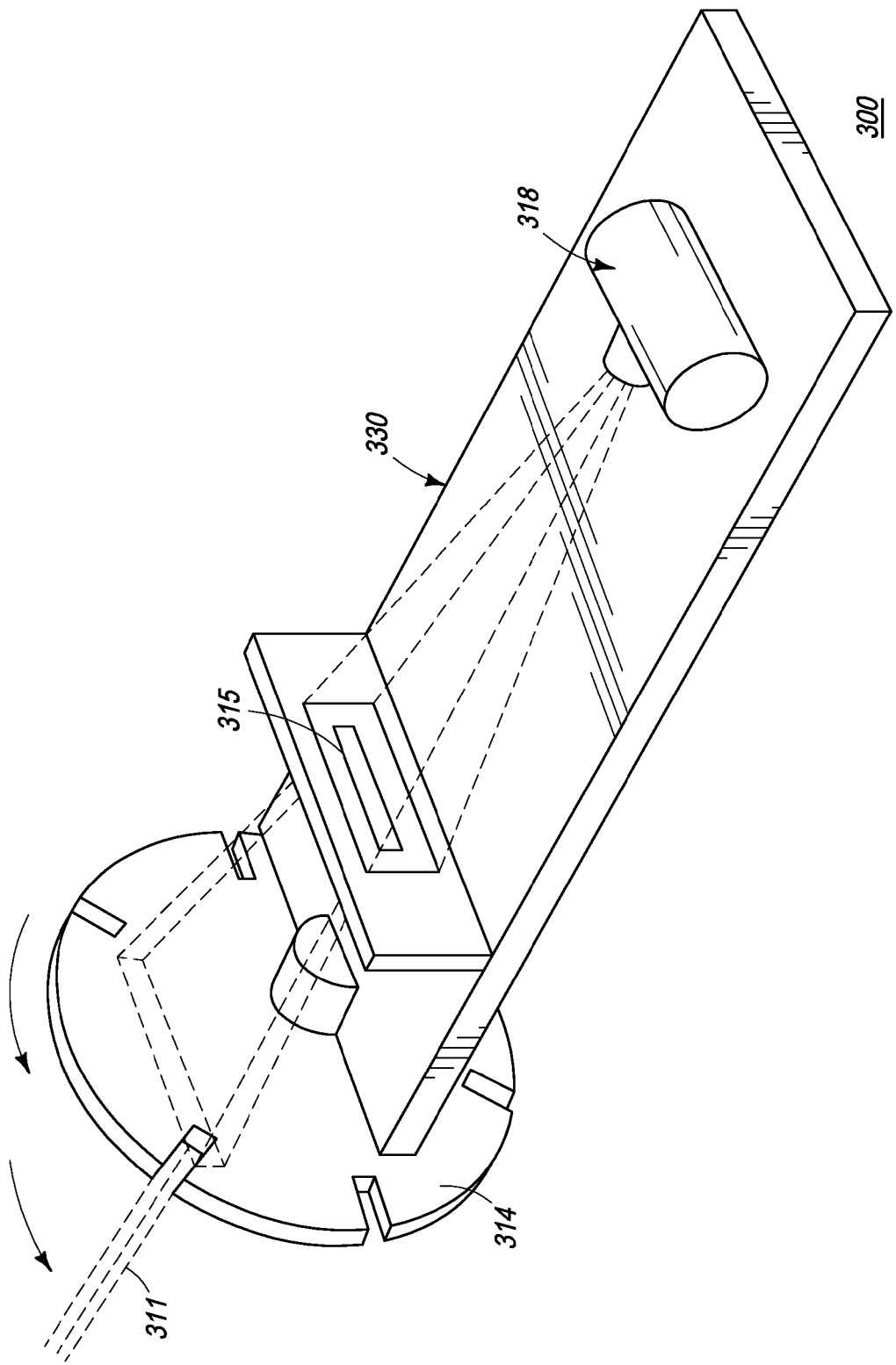
FIG. 3 is an illustration of the mechanical means employed to generate a sweeping pencil beam of X-rays in a backscatter detection system as used in one embodiment of the present invention.

FIG. 3 illustrates, in greater detail, the mechanical system for generating the sweeping pencil beam of X-rays. The mechanical system 300 comprises an X-ray pencil beam source 330 which sweeps X-rays 311 across the body of person under inspection. The mechanical system further comprises of an X-ray tube 318, a mechanical chopper wheel 314 and a slit 315 which combine to create an X-ray pencil beam source 330.

Figure 4:
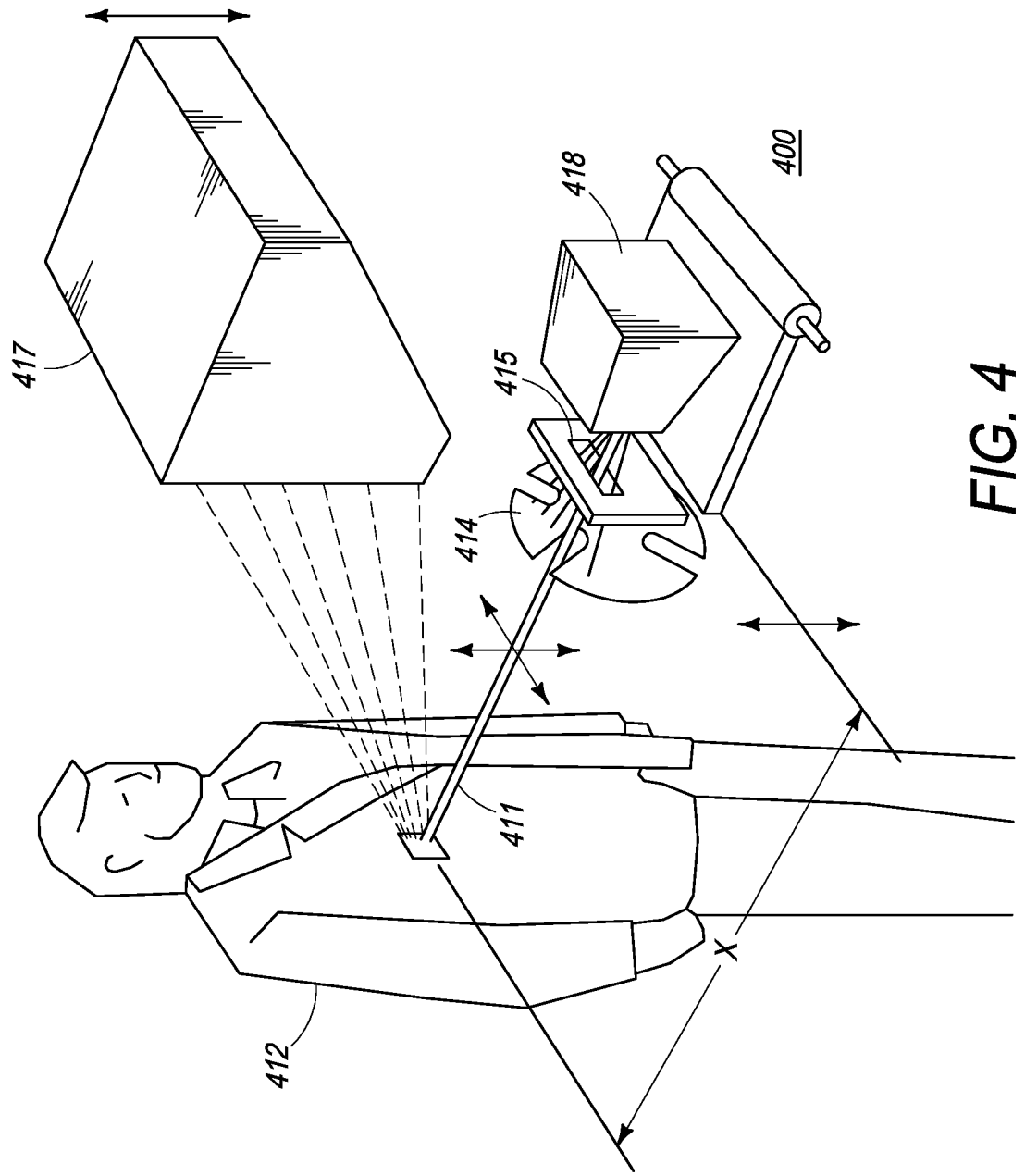
FIG. 4 is a schematic, perspective view of the detection system as used in the present invention.

FIG. 4 is a schematic, perspective view of the detection system 400 including detector 417 as used in one embodiment of the present invention, detailing the intersection of the pencil beam 411 and the body of the person 412 in order to define an image picture element of specified area. An X-ray source 418 generates an X-ray beam 411 that sweeps in a horizontal motion by means of a slit 415 and mechanical collimator 414. Simultaneous with the horizontal scanning motion, a vertical scanning motion occurs which displaces the X-ray beam vertically, upward or downward, in the time period required for one complete horizontal line. It should be noted herein that the displacement of the X-ray beam may be arbitrarily selected or pre-programmed. The resultant image acquisition area, or window, is sufficiently large to enable screening of most objects and more specifically, the entire body of most persons. A scanning cycle of the apparatus is defined as the time required for scanning the pencil beam of X-rays over each pixel in the image in order to provide a complete image of the person and objects positioned in the scanning window.

During the scanning process, the X-ray beam initially strikes only the person's body. Many of the X-rays penetrate a few centimeters into the body, interact by Compton scattering, and exit the body through the same surface that they entered. X-ray sensitive detectors, as described with respect to FIG. 5 below, are placed around the incident X-ray pencil beam to detect the scattered X-rays and provide an electronic signal characteristic of the X-ray reflectance.

Figure 5:
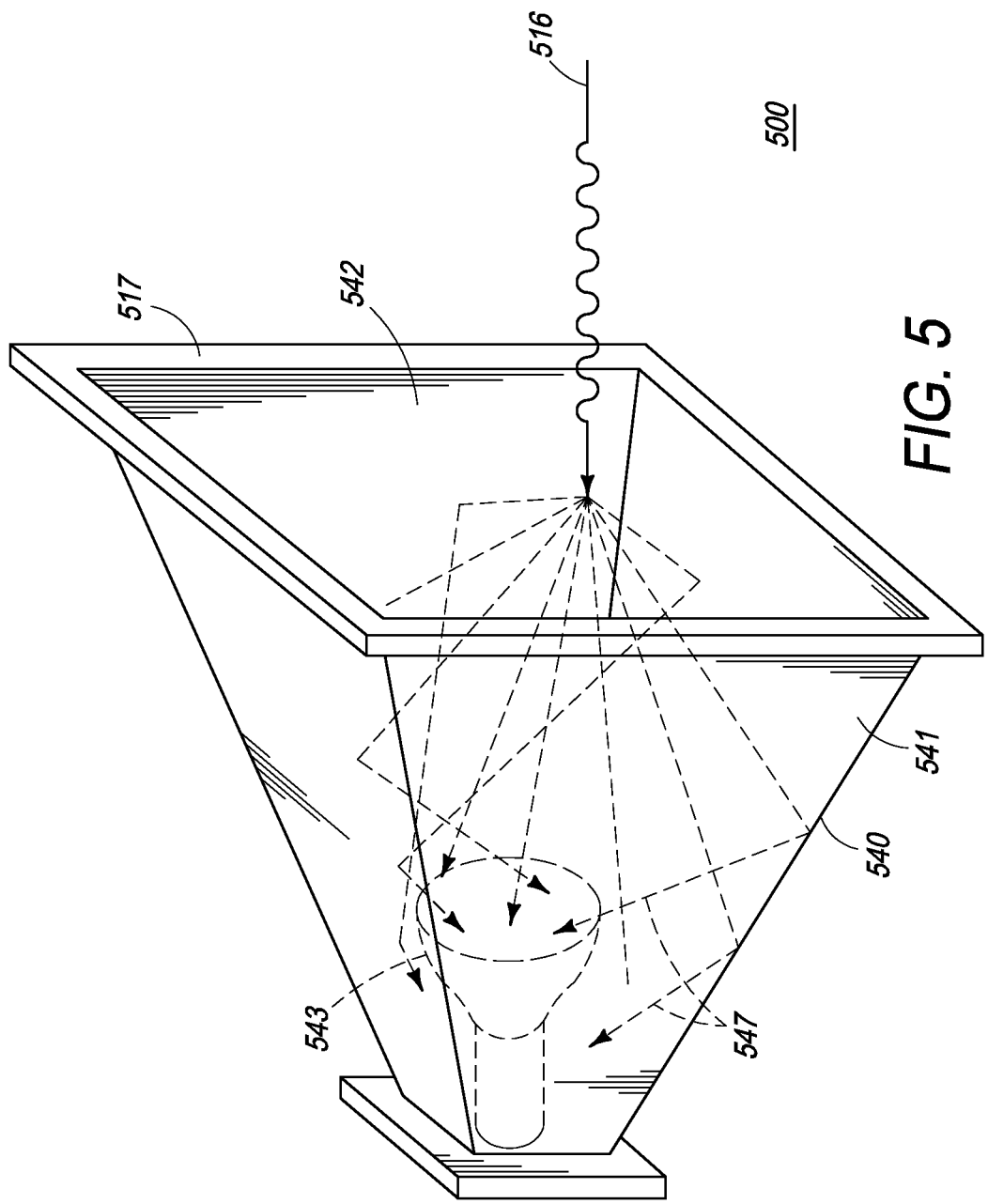
FIG. 5 is a diagram of an exemplary detector as used in the screening system of the present invention.

FIG. 5 is a diagram of an exemplary detector 500 as used in the security system of the present invention. As shown in more detail in FIG. 5, each detector 517 comprises an external light proof enclosure 540 having interior walls 541 comprised of light reflective surfaces. For example, but not limited to such example, light reflective surfaces may be provided by painting interior walls 541 white. An X-ray intensifying screen 542 forms a front cover or wall of enclosure 540. Screen 542 is preferably of the type used in radiography for increasing the exposure rate of X-ray film. A large area photomultiplier tube 543 is mounted at the opposite end of the interior of enclosure 540. X-ray photons 516 strike X-ray intensifying screen 542, thus producing light photons 547 in the interior of the external light-proof enclosure 540. A portion of the light photons 547 reflect off the white, or otherwise highly reflective, interior walls 541 of the enclosure and are detected by photomultiplier tube 543. Thus, the output signal of photomultiplier tube 543 is linearly related to the incident X-ray flux.

Operationally, in one embodiment, to initiate scanning and thus, the image processing techniques of the present invention, a single view scanning mode is employed, wherein the front side of a subject is scanned to obtain a digital image representation, followed by the back side. In alternate embodiments, several other scanning modes may be employed, including but not limited to a dual view scanning mode, in which a single scan is used to obtain front and back images of the subject under inspection. The original image is then processed by a computer system and a representation of that original image is displayed on a display or monitor located at the remotely located inspector station, as described with respect to FIG. 1.

The image representation of the subject under inspection located on the display or monitor at the remotely located inspector station is further analyzed by the image analyst. A computer system with automatic detection algorithms or a manual operator may be used for further identifying body regions that need to be transformed into detailed images because they contain evidence of the presence of dangerous concealed objects.

Predetermined density and area threat features are employed to determine the presence of a potential prohibited object. The system is created as "intelligent" in that it is trained to dismiss a small snap button as a threat, but alerts upon presence of a knife. Therefore, with the use of detection algorithms, the presence of metallic objects is established by first comparing the shading information and then the area, density and size information of the object detected, with a set of existing known objects including a gun, a key-ring or a button, but not limited to such examples of known objects.

Optionally, the image representation of the subject is annotated to indicate a specific area in which a threat item may be located. The resultant annotated image is then transmitted to the imaging system, wherein the screening system operator may perform a physical search or limited, directed "pat-down" of the subject under inspection.

FIGS. 6A, 6B, 6C, 6D, 6E, 6F, 6G, 6H, 6I, 6J, 6K, 6L, 6M, 6N, 6O, 6P, 6Q, 6R, 6S, and 6T illustrate the operational steps of various embodiments of the detection system of the present invention. FIG. 7 is a flow chart depicting the operational steps of the security and inspection system of the present invention. Reference to FIGS. 1 and 7 will also be made when referring to components of the imaging system and operational scanning steps, respectively, of the present invention.

Figure 6A:
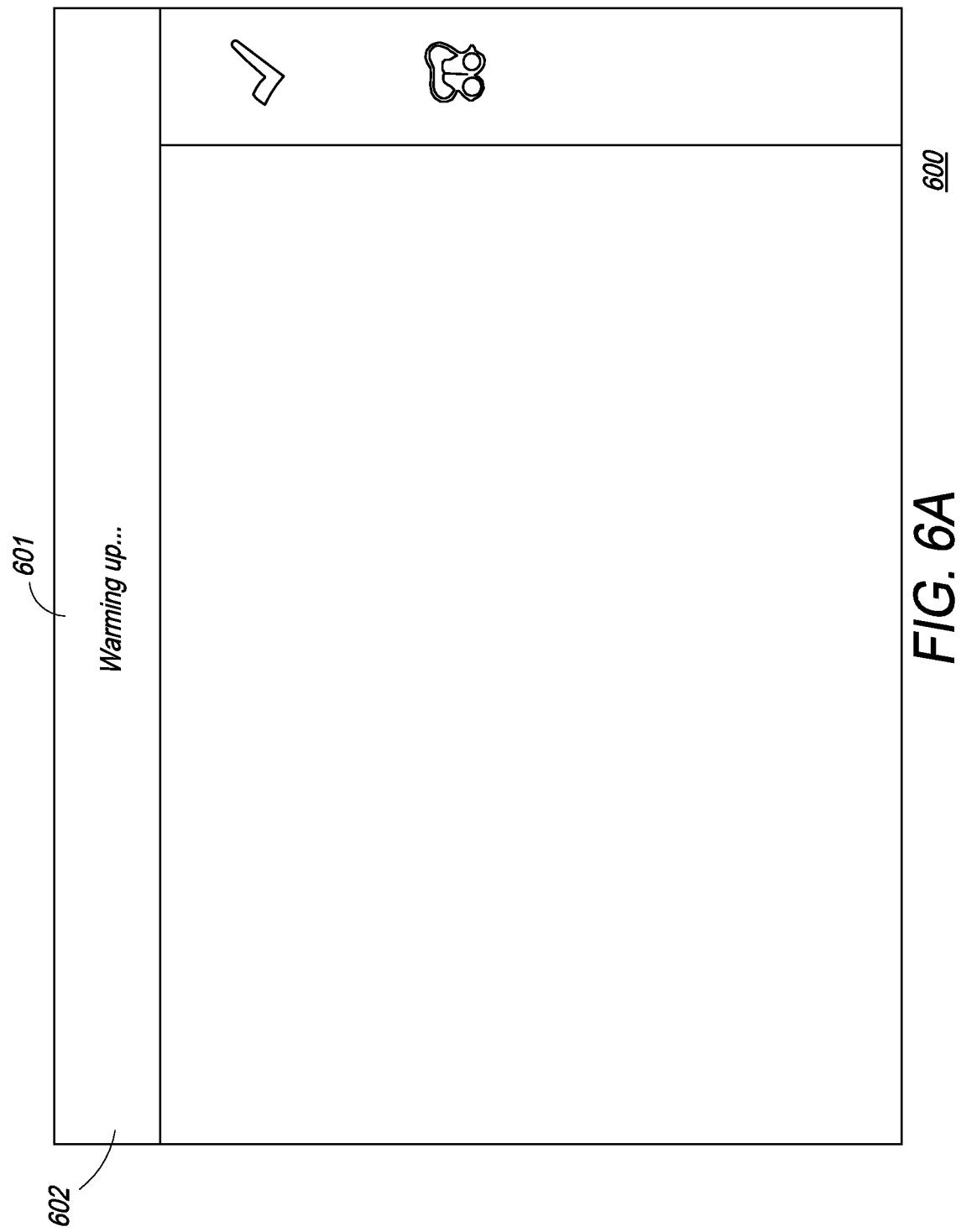
Figure 6B:
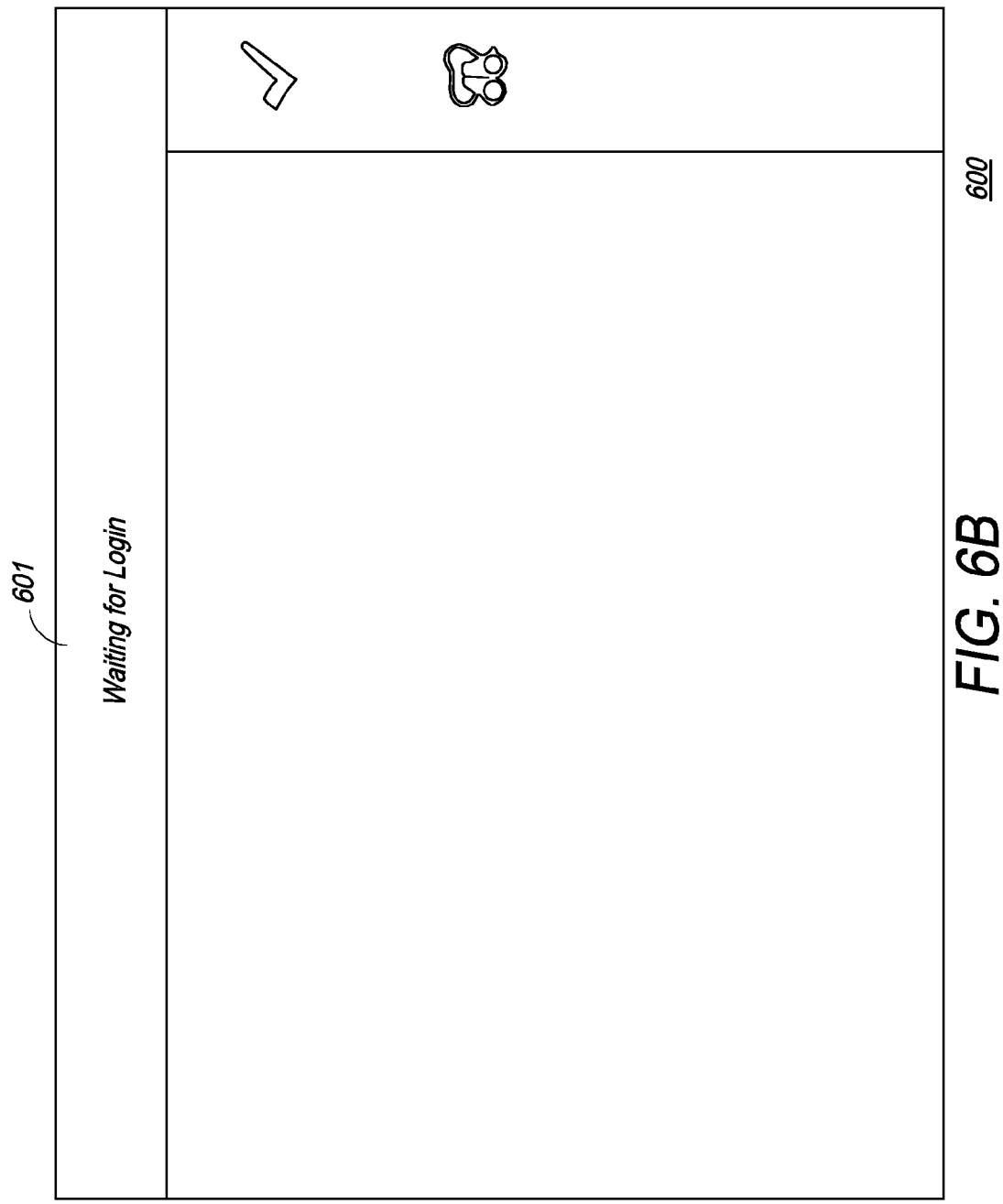

Now referring to FIG. 6A, and FIG. 1, in one embodiment of the present invention, GUI 600 of monitor 106 (shown in FIG. 1) of imaging system 105 (shown in FIG. 1) displays at least one status message 601 on status bar 602. In one embodiment, the at least one status message 601 may include, but is not limited to one of the following: a) READY FOR NEXT SCAN; b) READY FOR NEXT PERSON; c) SCANNING (IN PROGRESS); d) Extra Scan in Progress; e) CONDUCT SEARCH; f) ANALYZING; G) Waiting for Inspector; h) LOCKED; and i) Warming up . . . .

In one embodiment, the status message 601 communicates the actions of the image analyst to the screening system operator. In another embodiment, the status message is an indicator of the system's status. For example, as shown in FIG. 6A, after the system is powered on in step 701, status message 601 comprises a "Warming up . . . " message which appears on the GUI 600 of monitor 106 (shown in FIG. 1).

In addition, after the system is warmed up, the image analyst is instructed to log-on to the system (not shown). Once the image analyst logs on to the system in step 703, message 601, shown in FIG. 6B, comprises a "Waiting for Log-in" message and is communicated to and displayed on the monitor 106 (shown in FIG. 1).

Figure 6C:
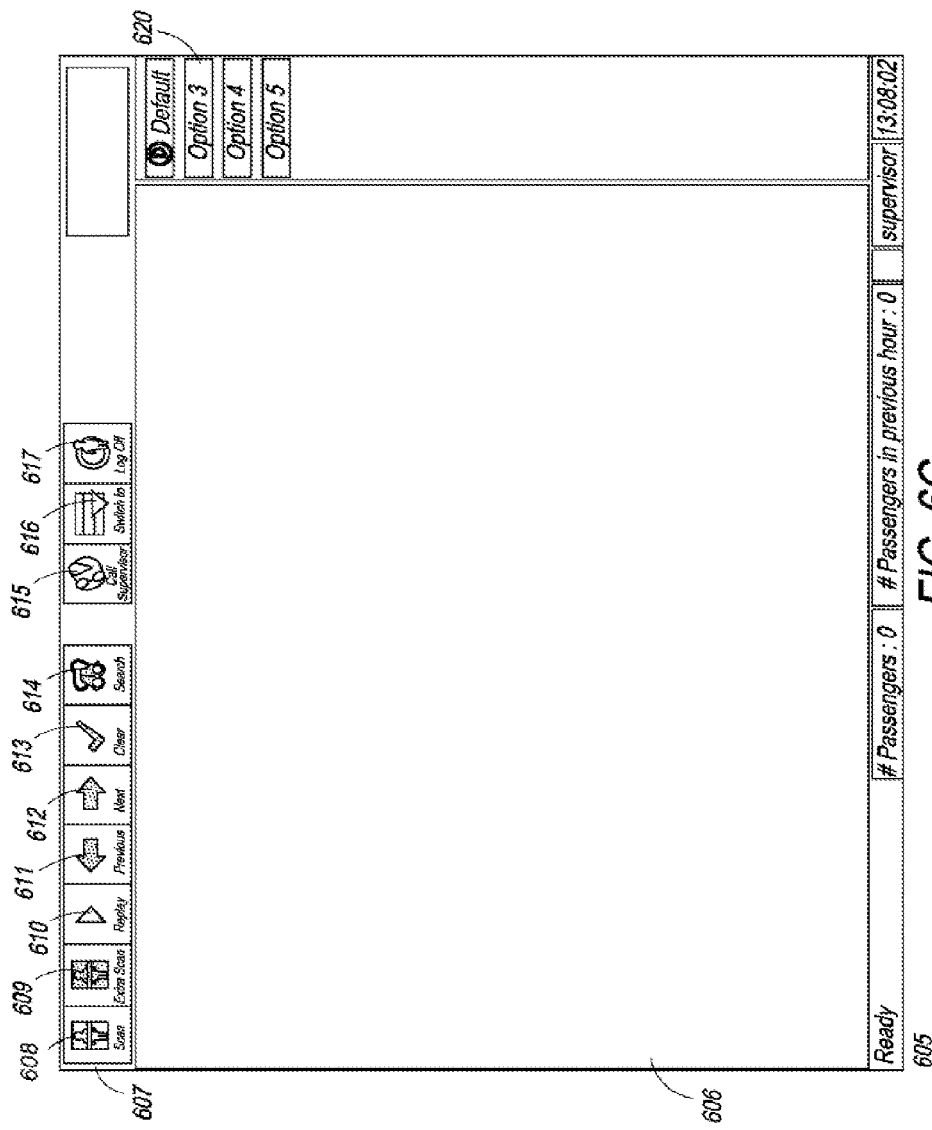

Now referring to FIG. 6C, in one embodiment, the GUI 605 of image analyst monitor 111 (shown in FIG. 1) comprises image display section 606 and inspection toolbar 607. In one embodiment, image representations of the subjects under inspection are displayed in the image display section 606. In one embodiment, inspection toolbar 607 is employed to display at least one inspection option button to the image analyst.

For example, inspection toolbar 607 may include, but is not limited to "scan" button 608, "extra scan" button 609, "replay" button 610, "forward" button 611, "next" button 612, "clear" button 613, "search" button 614, "call supervisor" button 615, "switch to" button 616, and "log-off" button 617. In addition, inspection toolbar 607 may optionally include other buttons not shown in this embodiment depending upon the inspection needs and mode of the system. For example, when a user is not logged into the system, "log off" button 617 becomes a "log-in" button (not shown). In one embodiment of the present invention, a predetermined action is performed when any of the abovementioned buttons is pressed.

In another embodiment, GUI 605 further comprises an option toolbar 620, which in one embodiment, is used to allow the image analyst to change the mode of operation of the imaging system of the present invention to provide for various image types, as described in further detail below.

It should be noted herein that any configuration or layout may be employed for the GUIs displayed on the display monitor of the present invention. It should be noted herein and understood by those of ordinary skill in the art that both the image analyst and screening system operator can input commands to a computing system that controls the GUI and imaging system of the present invention using any type of input device, including, but not limited to a mouse, touch screen or keyboard.

Figure 6D:
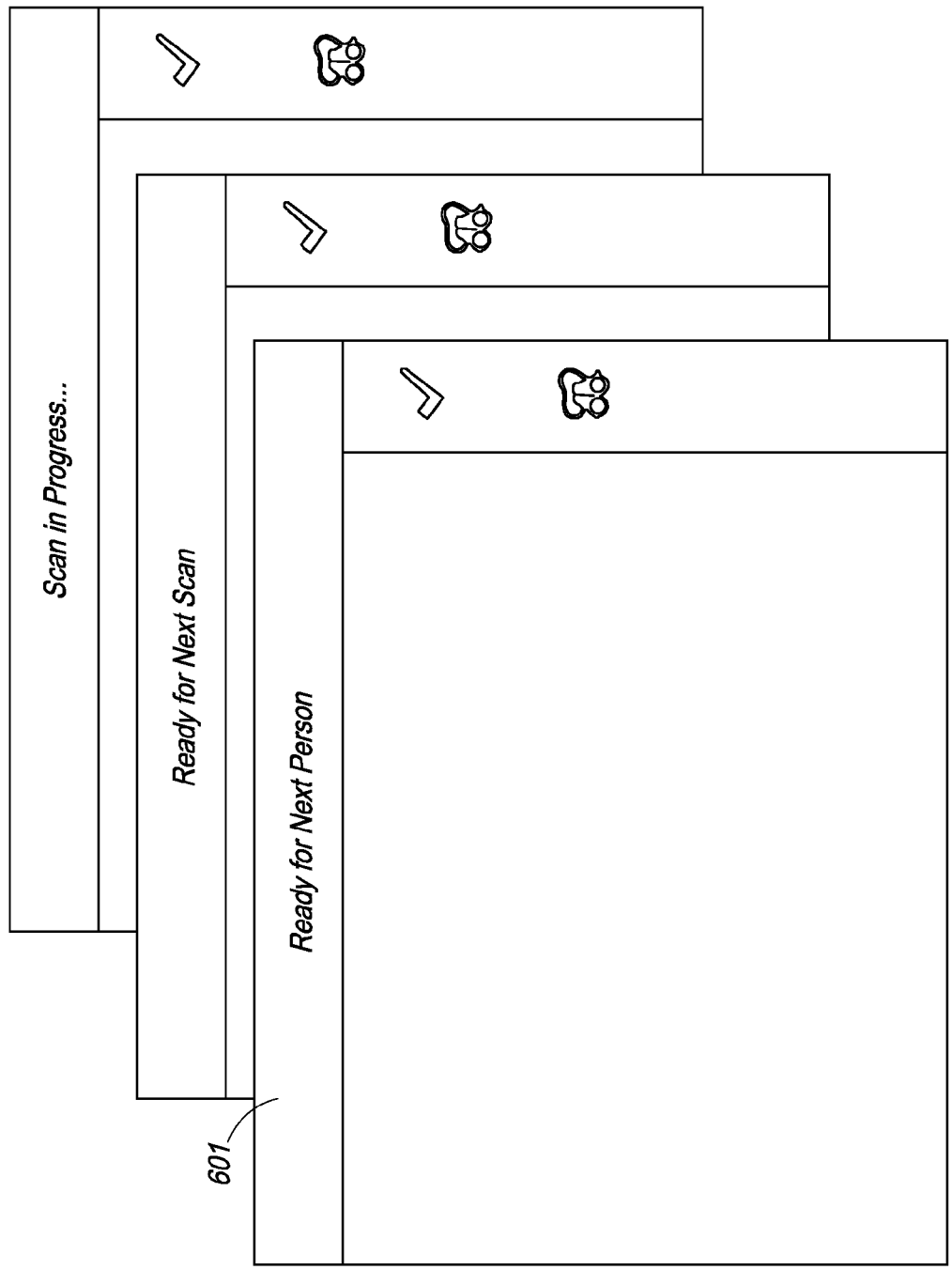

In one embodiment, scan button 608 is used to communicate to the screening system operator to begin positioning and scanning the subject present at the imaging site 105. As shown in FIG. 6D, when the system log-in is complete and the image analyst activates scan button 608 in step 705, status message 601, which comprises a "Ready for Next Person" message in one embodiment, is communicated to and displayed on the monitor 106 (shown in FIG. 1). In addition, status message 601 may indicate a "Ready for Next Scan" message to communicate to the screening system operator that the system is ready for the next scan.

Once a subject under inspection is in the portal and positioned for scanning, a scanning operation is initiated by the screening system operator in step 707. The scanning operation initiation means has already been described above with respect to FIG. 1. Subsequently, message 601 is a "Scan in Progress . . . " message to indicate that the system is in use, as shown in FIG. 6D.

Figure 6E:
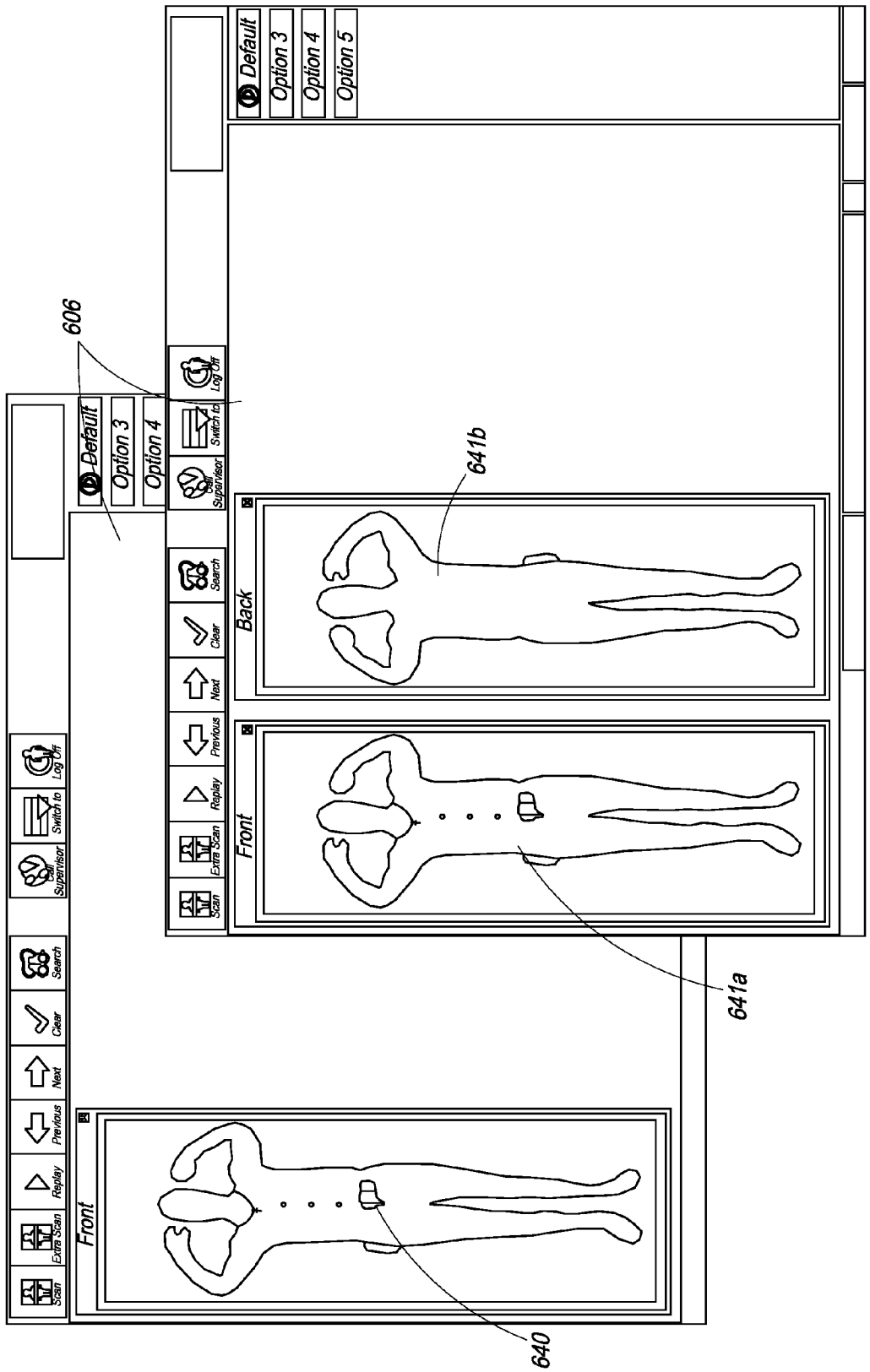

In one embodiment, the scanning operation generates an image representation of the subject, which is subsequently displayed within image display section 606 of image analyst monitor 111 (shown in FIG. 1), as shown in FIG. 6E. In an optional embodiment, the image representation of the subject is also displayed on imaging monitor 106. In another embodiment, and shown in further detail with respect to FIG. 6E, both front and back images of the subject are rendered on the image display section for more complete inspection of the subject. In one embodiment, the front of the subject is scanned in step 709 to provide a front image view 640 of the subject under inspection. In one embodiment, the subject is instructed by the screening system operator to turn around in step 711 to provide a back image view of the subject under inspection. In one embodiment of the present invention, to mitigate the confusion associated with the front and back images of a subject, the front image 641a may be rendered on the left side of the screen 606 while the back image 641b may be rendered on the right side of screen 606. Optionally, the subject may be instructed to pose in several different configurations until a threat item can be cleared, with each subsequent scan appearing to the right of the last scan. Thus, in one embodiment, the scans appear on the screen in the order in which they were taken.

Figure 6F:
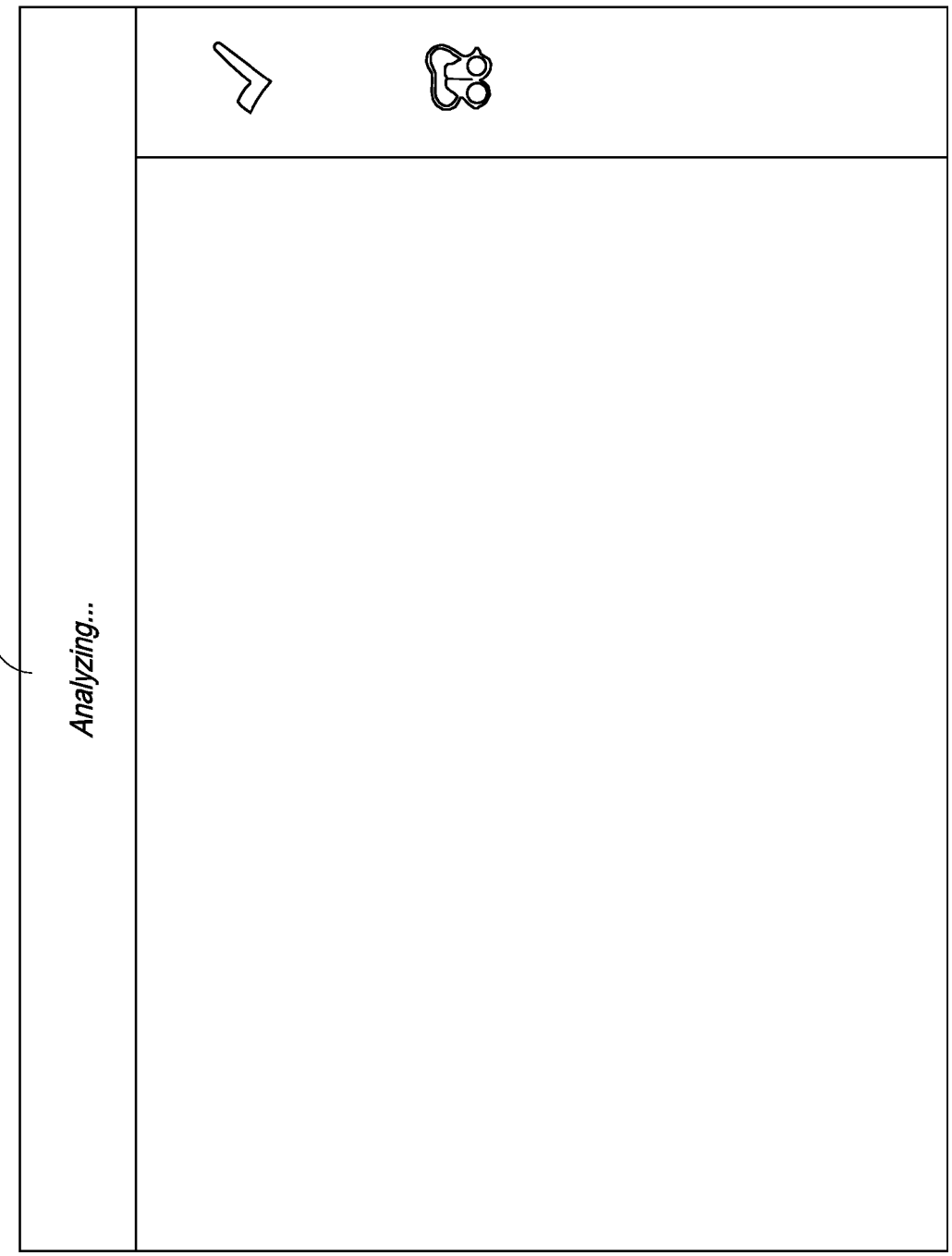

As shown in FIG. 6F, status message 601 on imaging monitor 106 (shown in FIG. 1) reads "Analyzing . . . " while the image analyst inspects the images on image analyst monitor 111 to communicate to the screening system operator that the image analyst is in the process of reviewing the images on image analyst monitor 111 in step 713.

Figure 6G:
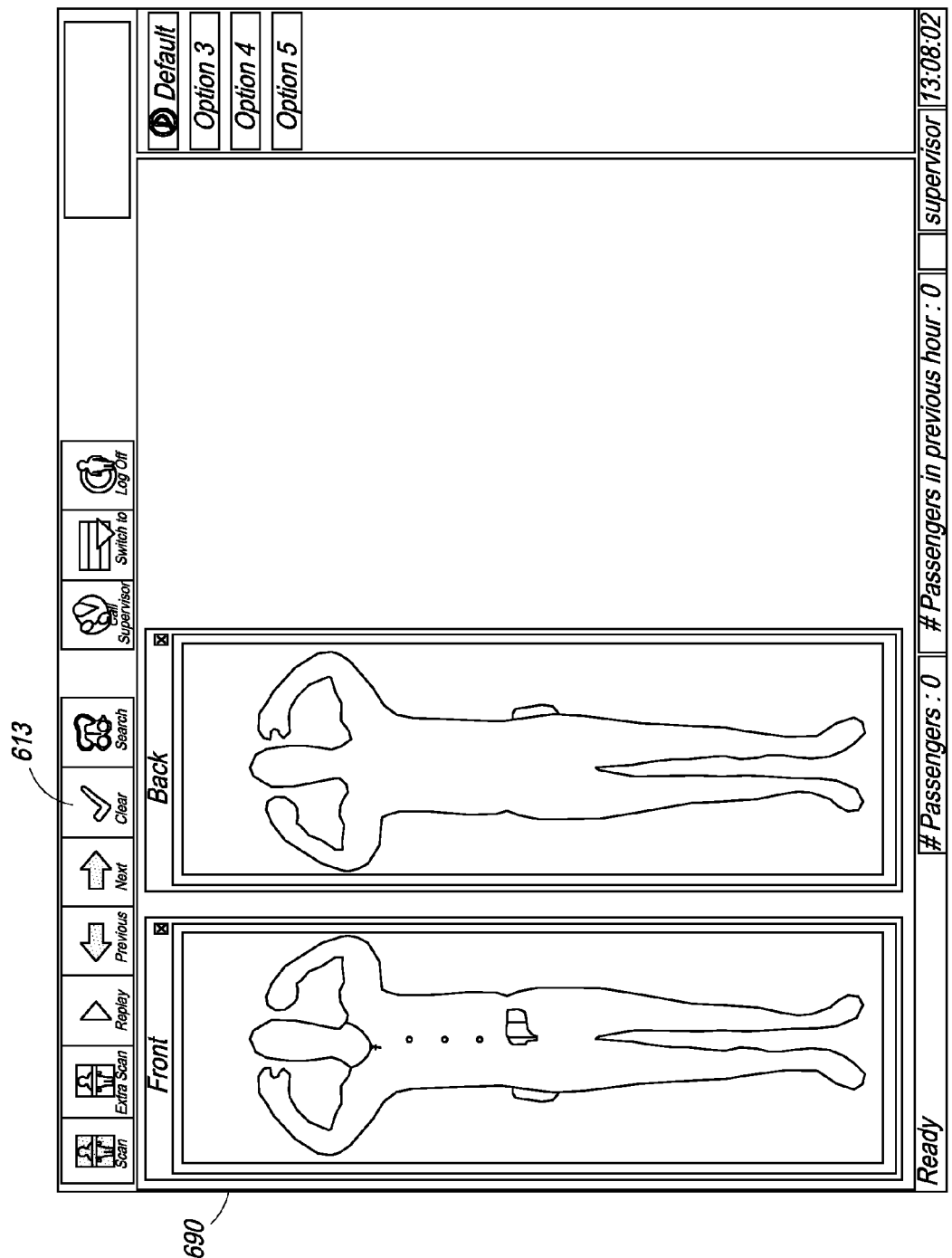
Figure 6H:

In step 715, in one embodiment, if there are no threat items or regions of interest present on the subject under inspection, as can be seen by the image analyst on GUI 690 to the image analyst in FIG. 6G, the image analyst may hit the clear button 613. Subsequently, the subject is cleared by the screening system operator to move ahead with no further inspection and the subject may exit the inspection area 107. As shown in FIG. 6H, the monitor 106 (shown in FIG. 1) displays status message 601 as "Ready for Next Person . . . " when the image analyst clears the computer system for the next subject.

In an alternate embodiment, in step 715, if there is a threat area, a region of interest on the subject under inspection, or an unclear area on the image, the image analyst optionally requests an additional scan by activating extra scan button 609. If an extra scan is requested, this is communicated to the screening system operator in the form of status message 601, and in optional step 716, the screening system operator conducts an additional scan of the subject under inspection.

Optionally, however, if a subject under inspection cannot be cleared due to the presence of a potential threat, the image analyst requests, in step 717, that the screening system operator conducts a manual search of the subject under inspection. In one embodiment, the image analyst requests that the screening system operator conduct a manual search via a verbal request or command.

Figure 6I:
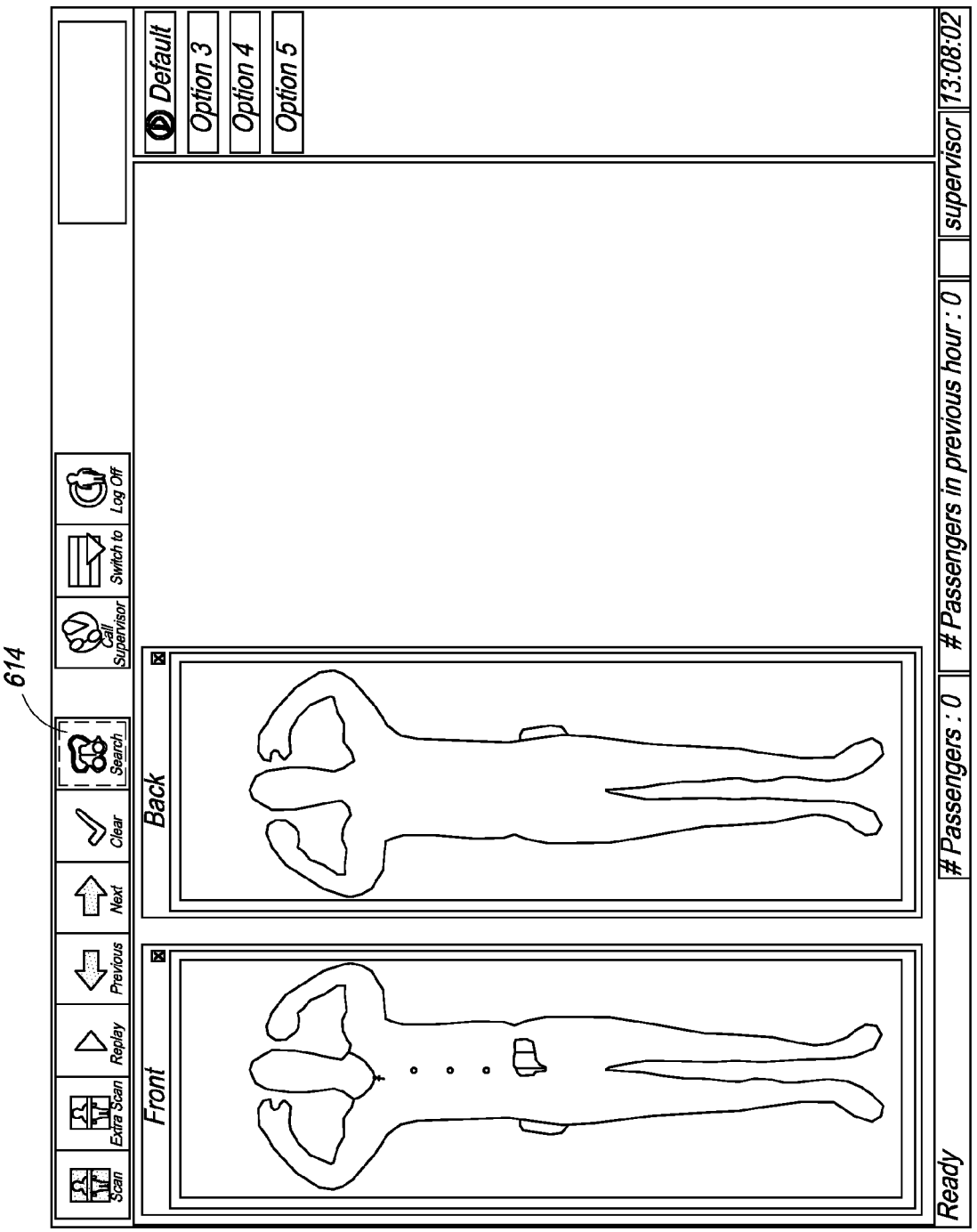
Figure 6J:
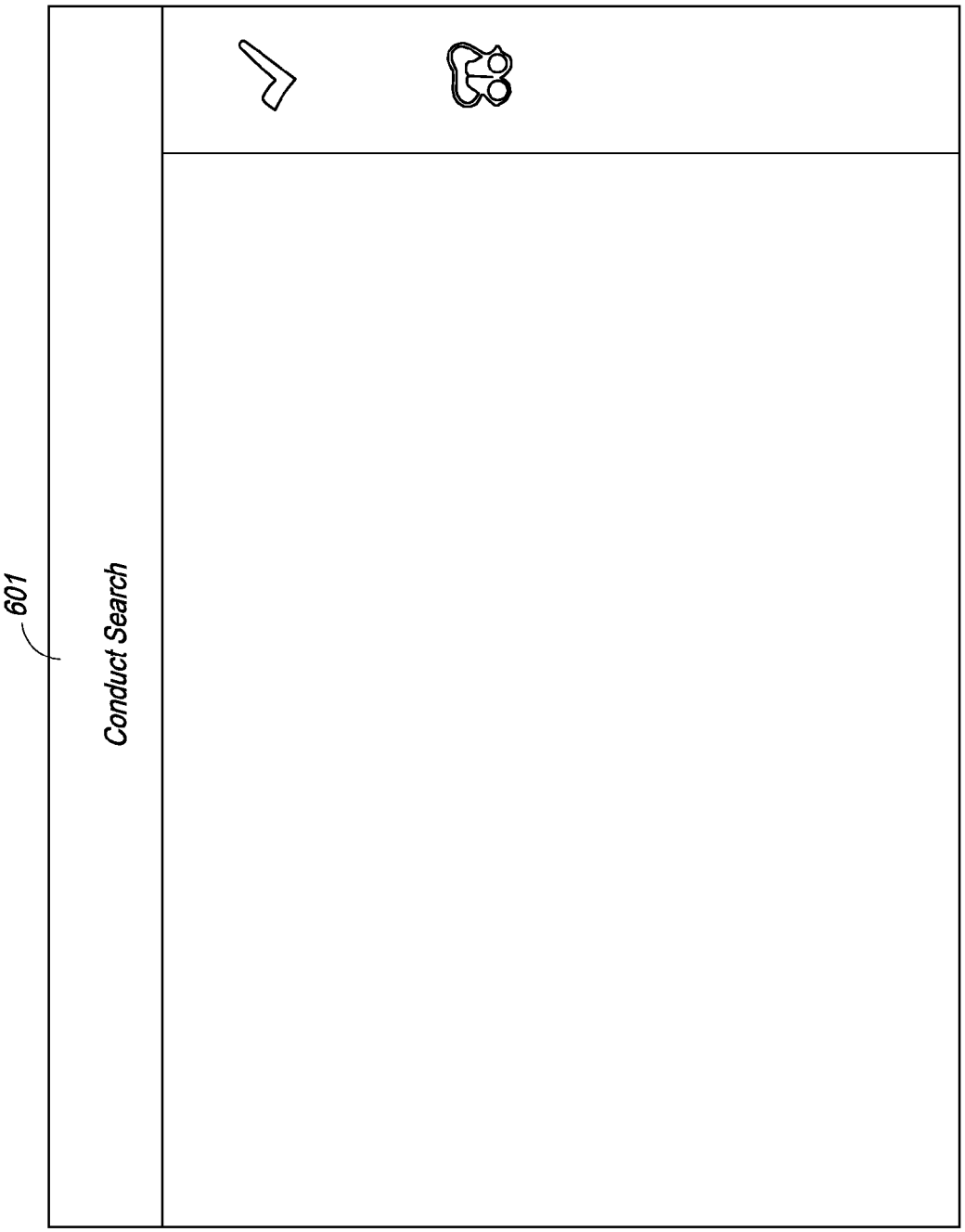

In another embodiment, the image analyst requests that the screening system operator conduct a manual search of the subject under inspection, via search button 614 as shown in FIG. 6I. In one embodiment, once search button 614 is activated, the manual search request is communicated to the screening system operator, as shown in FIG. 6J, as a status message 601, indicating "Conduct Search . . . ".

Figure 6K:
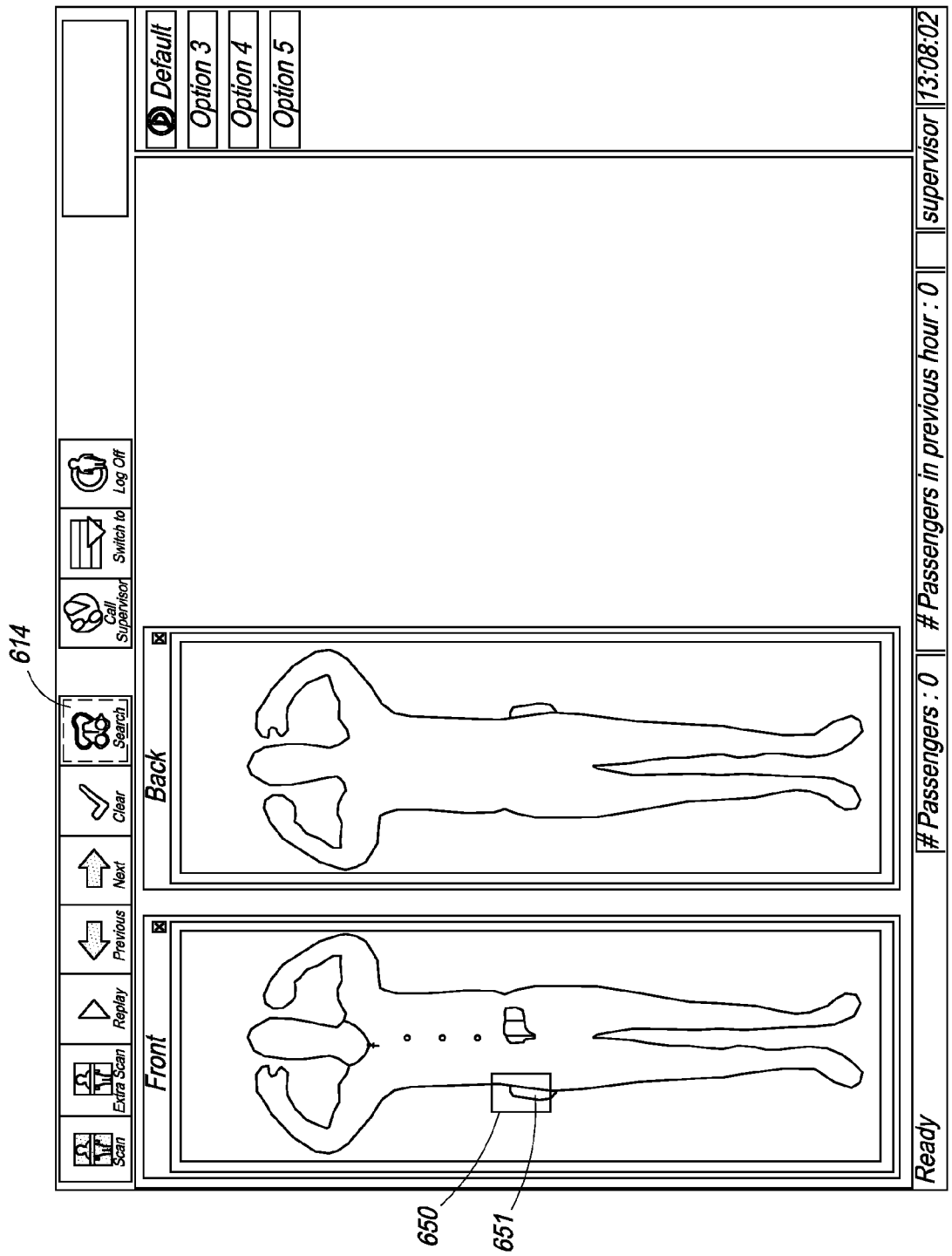

In another embodiment, upon activation, as shown in FIG. 6K, search button 614 optionally enables the image analyst to outline or annotate, in step 719, the image representation and communicate to the screening system operator, a visual or pictorial representation that directs the screening system operator to search a specific location on a subject's body to identify the presence of a threat. In one embodiment, the outline is a rectangle, square, or circle, or any other suitable shape or indicator that identifies a directed area on the subject's body where a threat item or region of interest may be located. For example, but not limited to such example, as shown in FIG. 6K, rectangle 650 is used to outline a possible threat area 651 on the subject's body and is thus subject to an accurate, directed physical search. It should be understood to those of ordinary skill in the art that an unlimited number of annotations may be made on any image view by the image analyst.

Figure 6L:
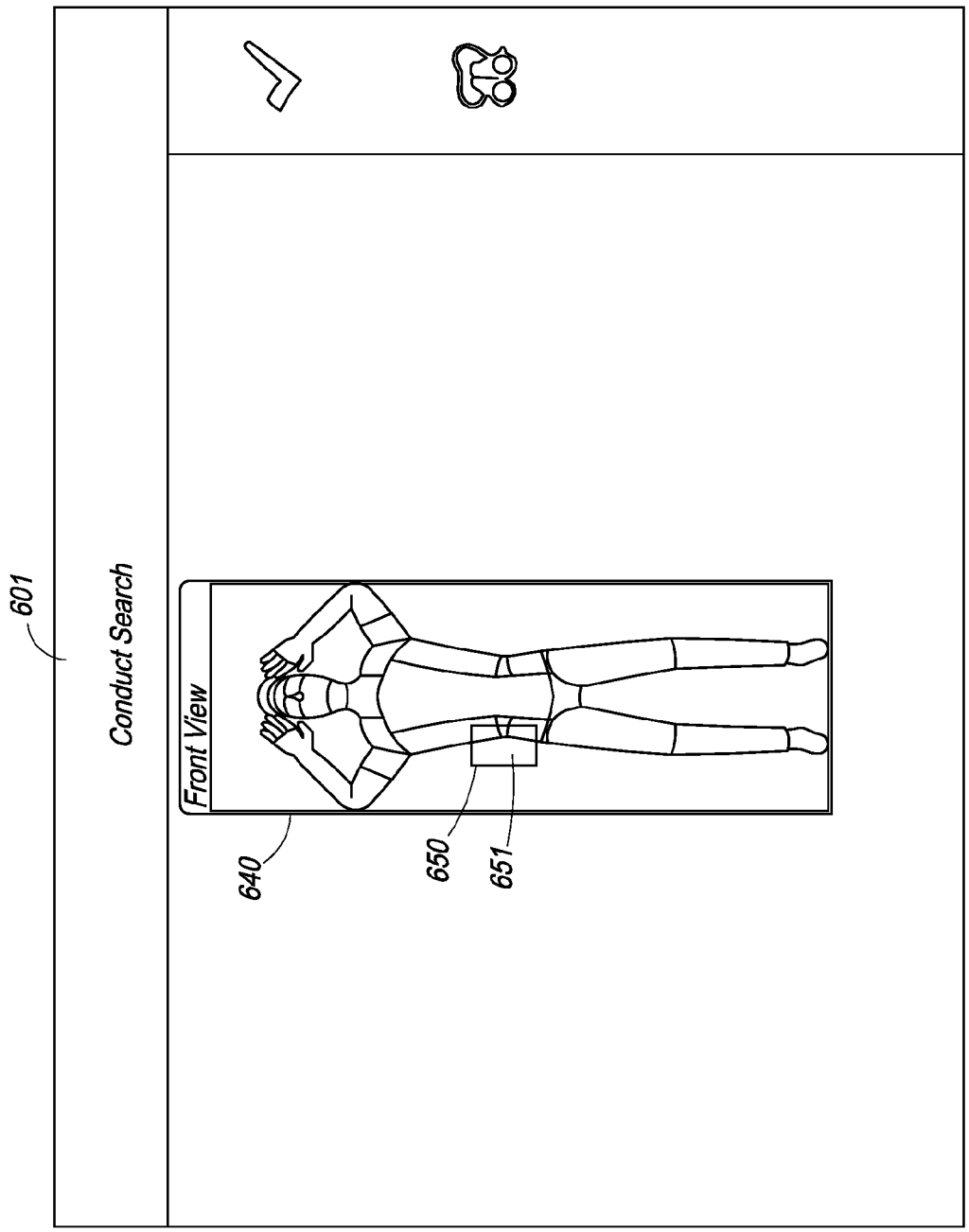

The resultant communication is shown in FIG. 6L, where both status message 601 and annotated image representation 640 are shown to screening system operator on monitor 106 (shown in FIG. 1). The scanned image representation 640 is a limited detail generic human representation image of the front side of a subject under inspection, also showing annotation rectangle 650, highlighting possible threat area 651 on the subject's body for a directed physical search.

Figure 6M:
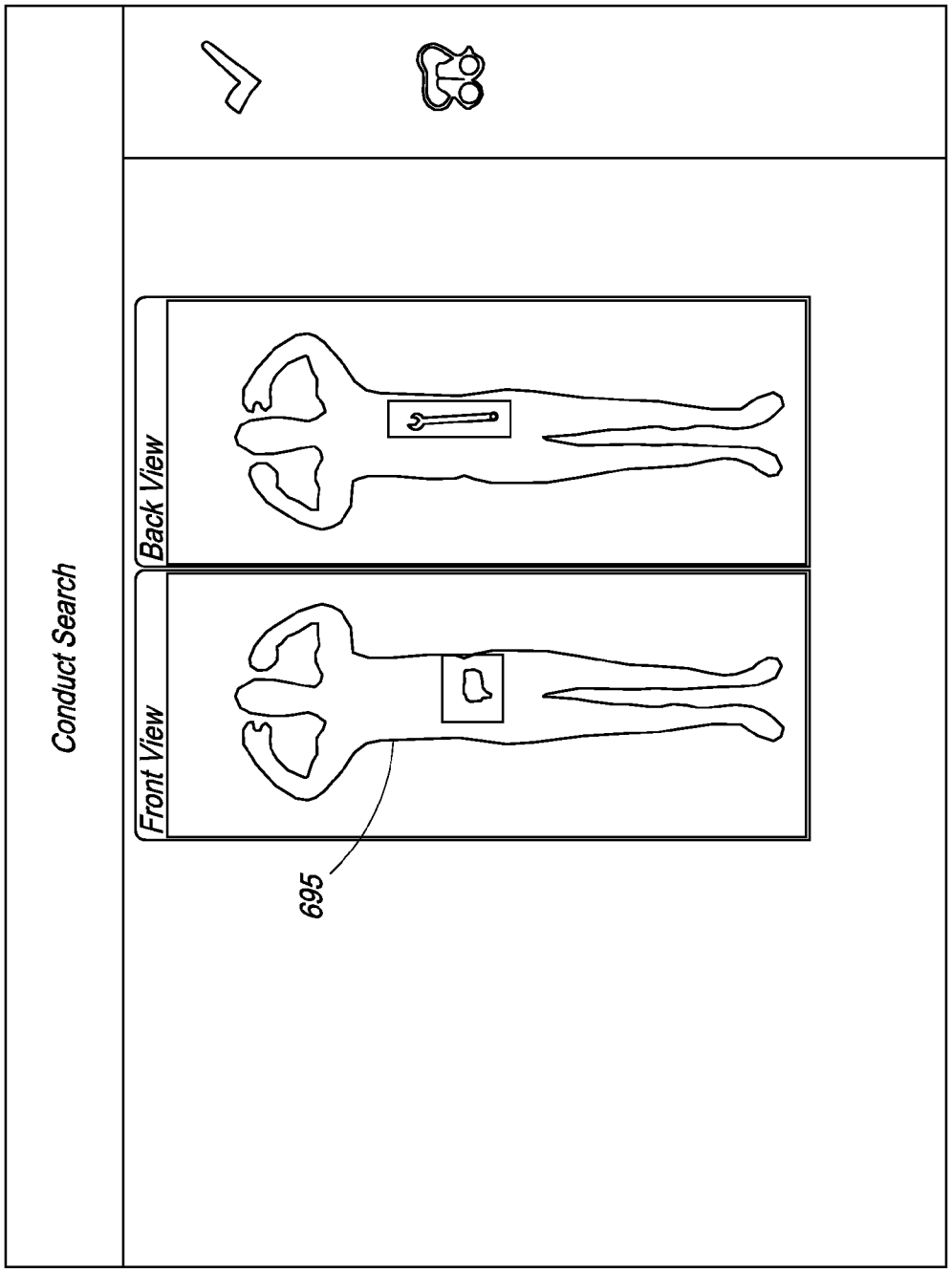

As shown in FIG. 6M, in one embodiment, the present invention employs at least one high privacy outline 695 of the subject instead of a generic human representation image for much higher accuracy in locating objects. U.S. Pat. No. 7,796,733 B2, assigned to the assignee of the present invention, discusses details of several embodiments of image processing methods and is herein incorporated by reference.

Figure 6N:
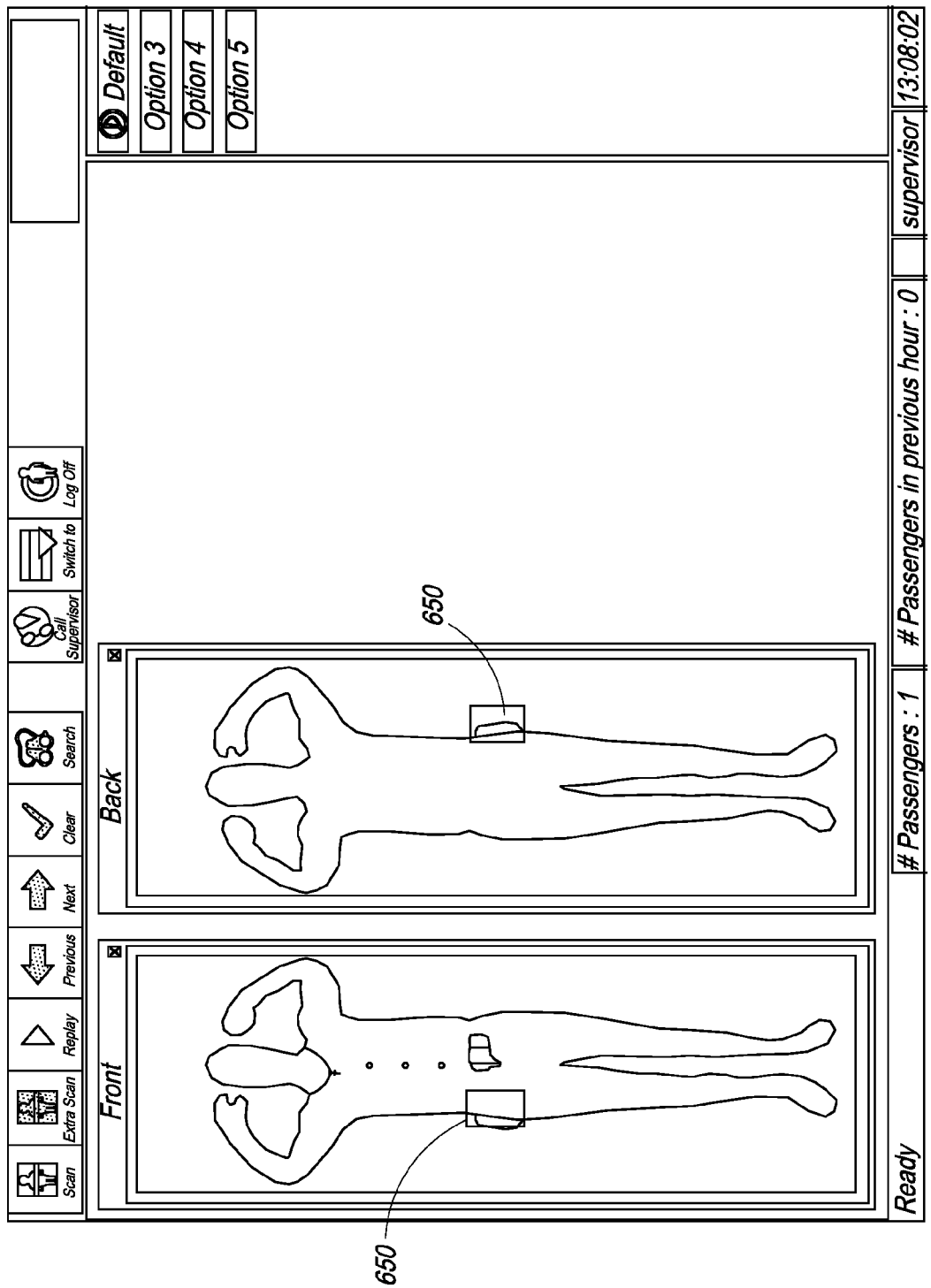
Figure 60:
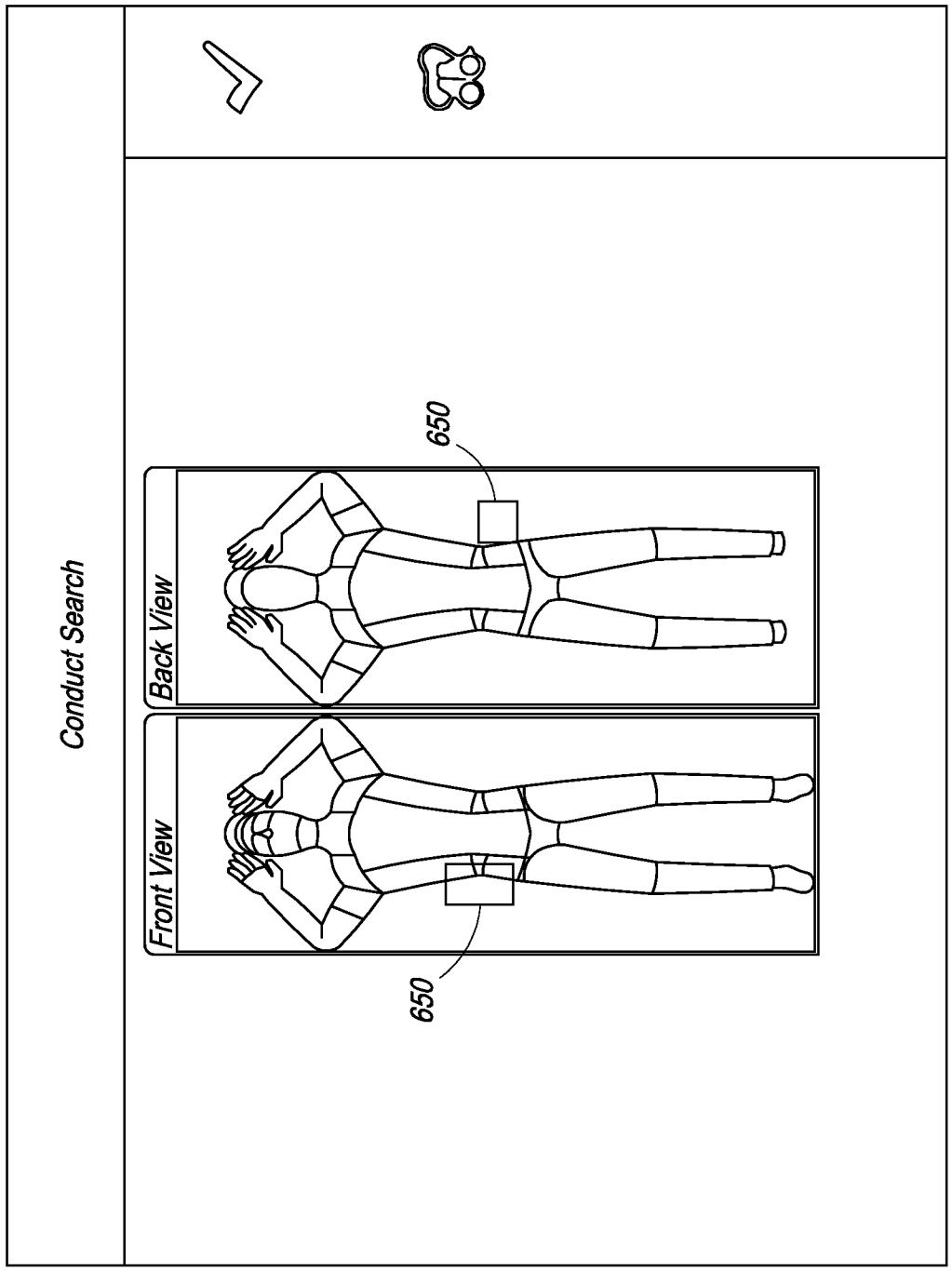
Figure 6P:
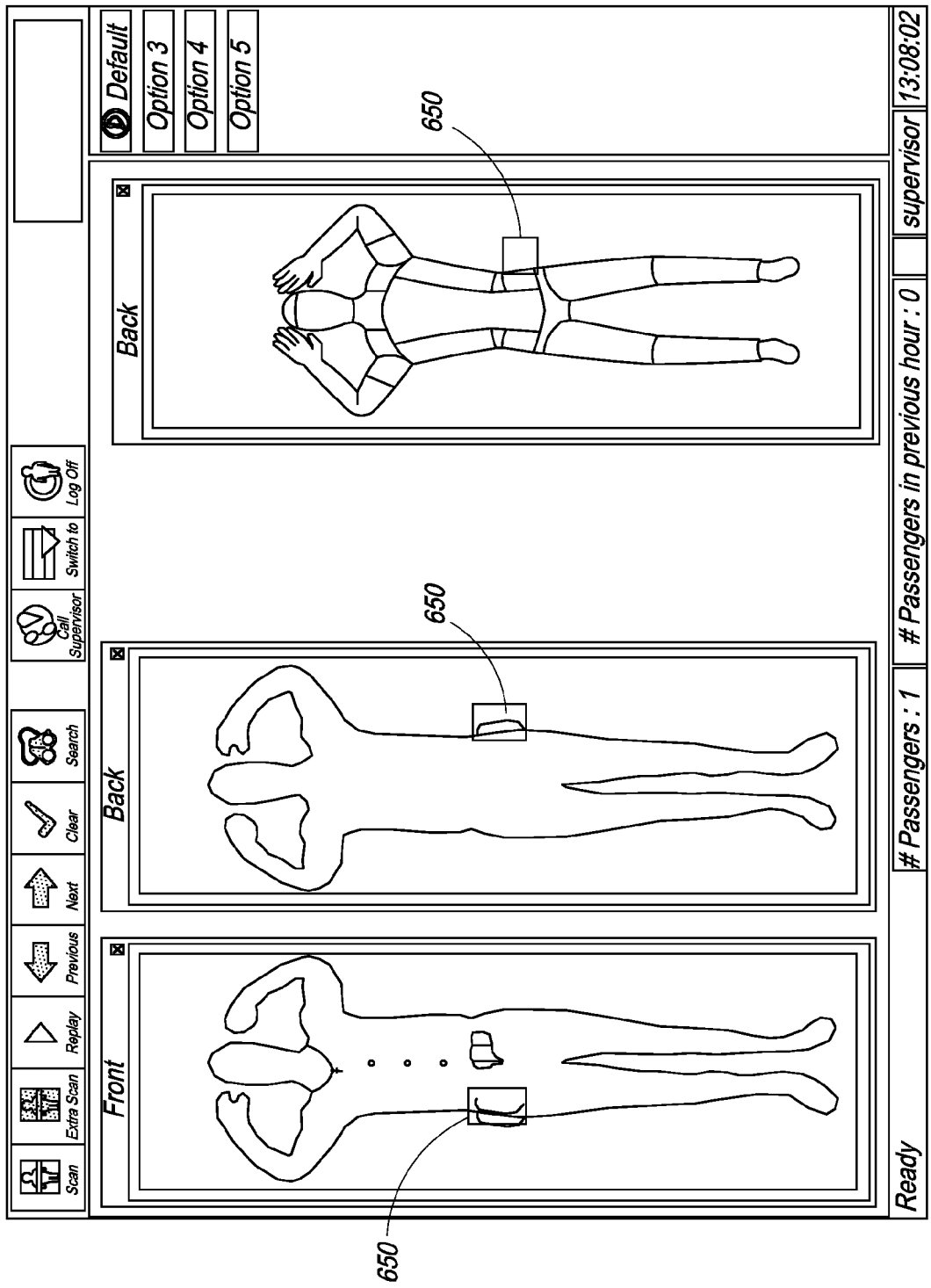

As shown in FIG. 6N, sometimes, when the image analyst annotates a portion of the subject under inspection's body, using rectangles 650, these annotations are not accurately represented on the monitor 106. As shown in FIG. 6O, the annotation rectangles 650 land slightly off target due to image rendering between the different systems and annotation translation between the different size images on image analyst monitor 111 and monitor 106. This is generally because the generic human representation does not effectively correspond to various human body types. Therefore, in another embodiment, as shown in FIG. 6P, the image analyst has a view of both the detailed image representations of the subject under inspection and the generic human representation on image analyst monitor 111 so that the image analyst can reposition any annotation rectangle or search box 650. The resultant correction is shown in FIG. 6Q.

Figure 6R:
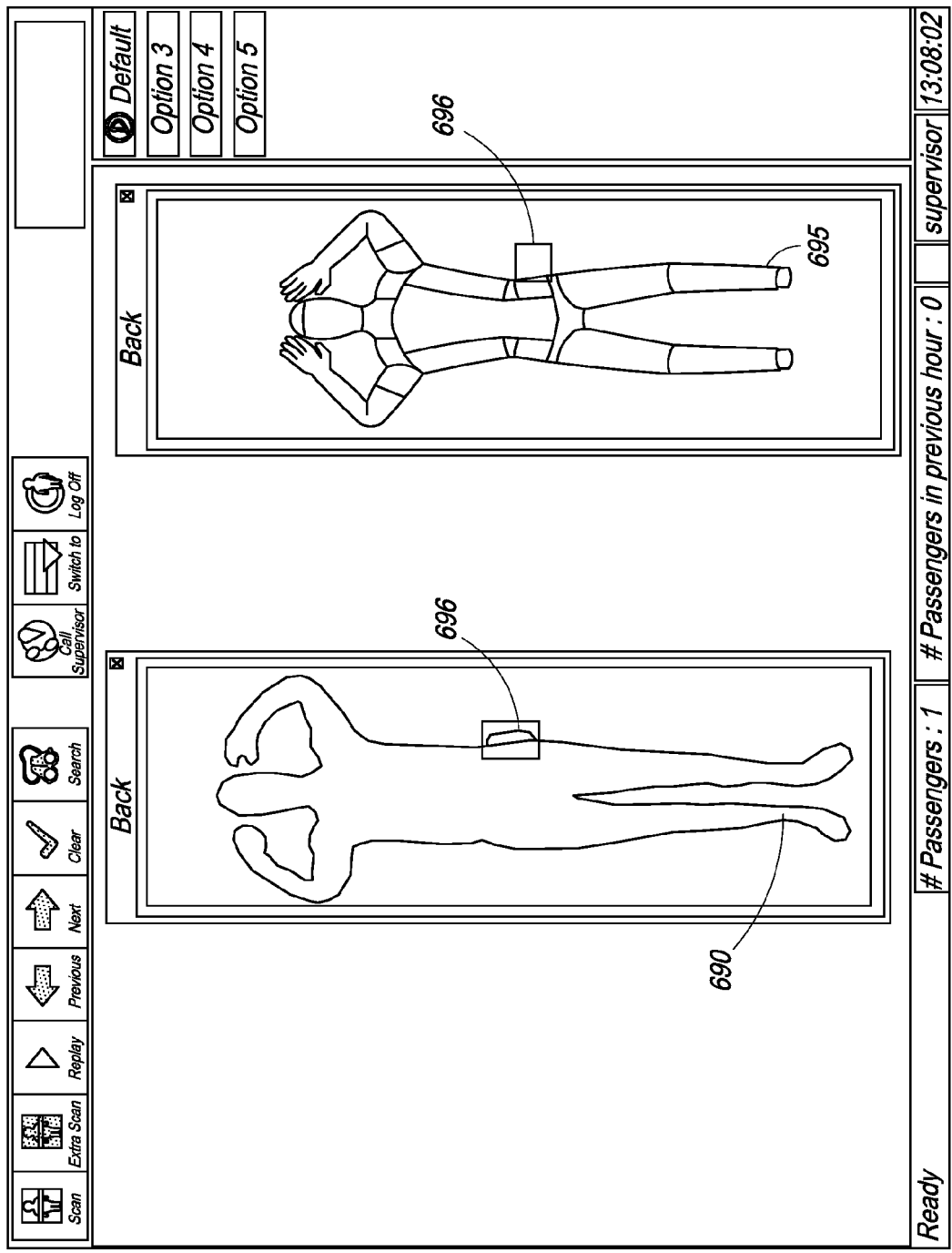

In yet another embodiment, the security and inspection system of the present invention is capable of measuring a human body's characteristics and communicating that information to the image analyst station. As shown in FIG. 6R, the human scan representation 690 shown to the image analyst is different in size from the generic image representation 695 shown to the screening system operator. In order to correct for size difference without image analyst manipulation, in one embodiment, the imaging system portion of the present invention is capable of measuring at least one height point, at least one left position point, and at least one right position point, and using a ratio that is dependent on those measurements, is further capable of repositioning the annotations to the correct area. Thus, the annotation boxes 696 are mapped appropriately to a single-sized generic image representation, and as shown in FIG. 6R, appear on the appropriate location on the generic image representation.

In another embodiment, the security and inspection system of the present invention is capable of measuring a plurality of height points, a plurality of left position points, and a plurality of right position points, and using a ratio that is dependent on those measurements, is further capable of repositioning the annotations to the correct area and creating a contour map.

In one embodiment, an algorithm is employed to perform a calculation that correlates the anatomy of the human scan representation 690 with the anatomy of generic image representation 695.

In yet another optional embodiment, the image analyst can select a "matching" body type for the subject under inspection depending upon that subject's physical characteristics.

As described above with respect to FIG. 6E, both front and back images of the subject are rendered on the image display section for more complete inspection of the subject. In one embodiment of the present invention, to mitigate the confusion associated with the front and back images of a subject, the front image may be rendered on the left side of the screen 606 while the back image may be rendered on the right side of screen 606. Optionally, the subject may be instructed to pose in several different configurations until a threat item can be cleared, with each subsequent scan appearing to the right of the last scan. Thus, in one embodiment, the scans appear on the screen in the order in which they were taken.

The annotated data received at the monitor 106 of the imaging system enables fast visual association of potential threat object location. Thus, screening system operators can perform a more directed physical search to determine the presence of an actual threat.

In one embodiment of the present invention, the annotated information associated with the image is communicated to the screening system operator. In yet another embodiment of the present invention, the inspector station personnel or image analyst may press the call supervisor button 615, shown in FIG. 6C, to convey details about the annotated data and threat information verbally to the screening system operator.

Optionally, based on the annotated image representation of the subject under inspection, the screening system operator performs, in step 721, a physical search of the suspect under inspection at the desired portion of the body conveyed by the inspector station personnel.

In one embodiment of the present invention, the more accurately directed physical search allows for significant improvements in throughput and reduced operational costs owing to the reduction in time to communicate potential threat locations between the remotely located inspector station and the reduction in time of performing physical searches of the subject under inspection.

Figure 6S:
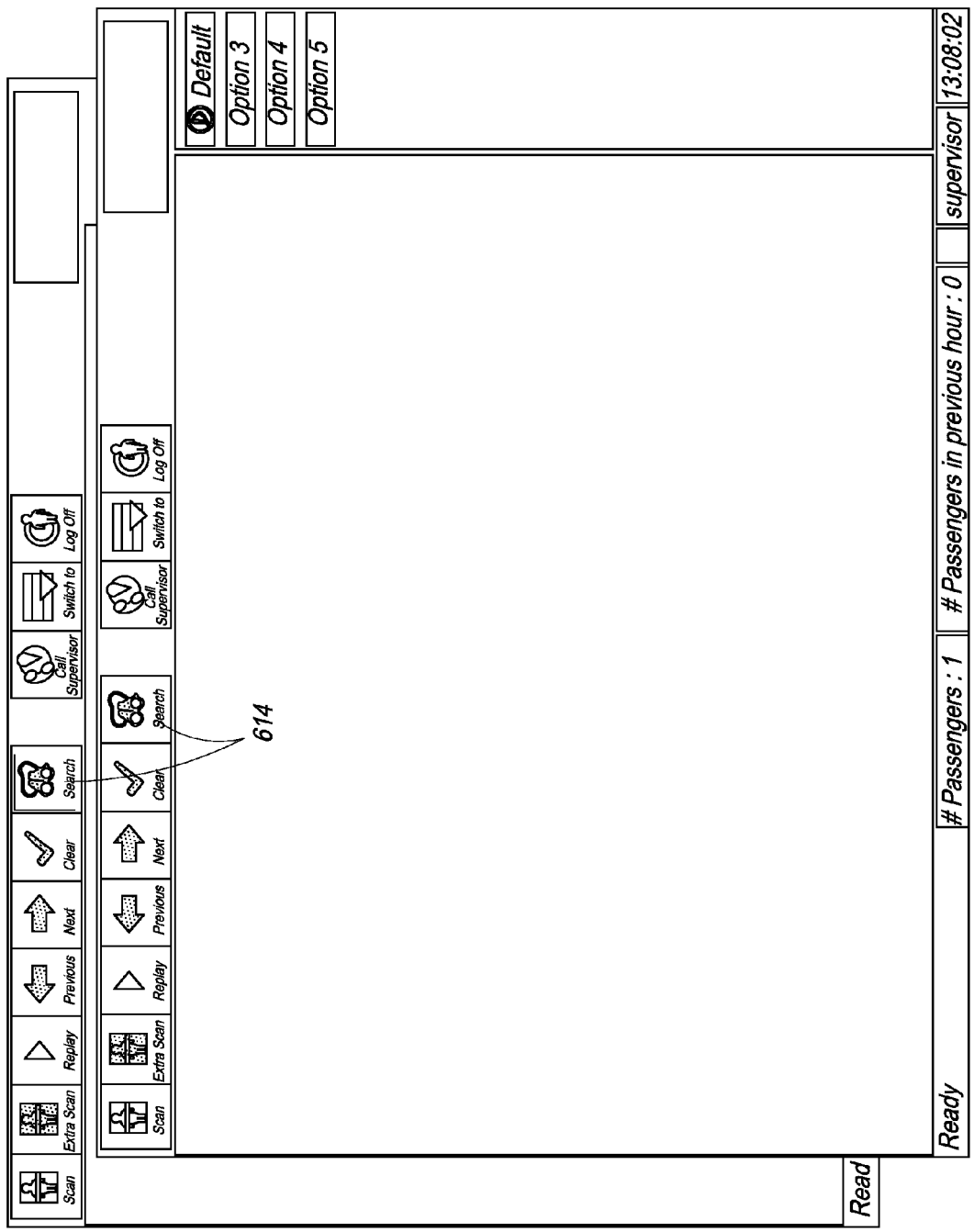
Figure 6T:
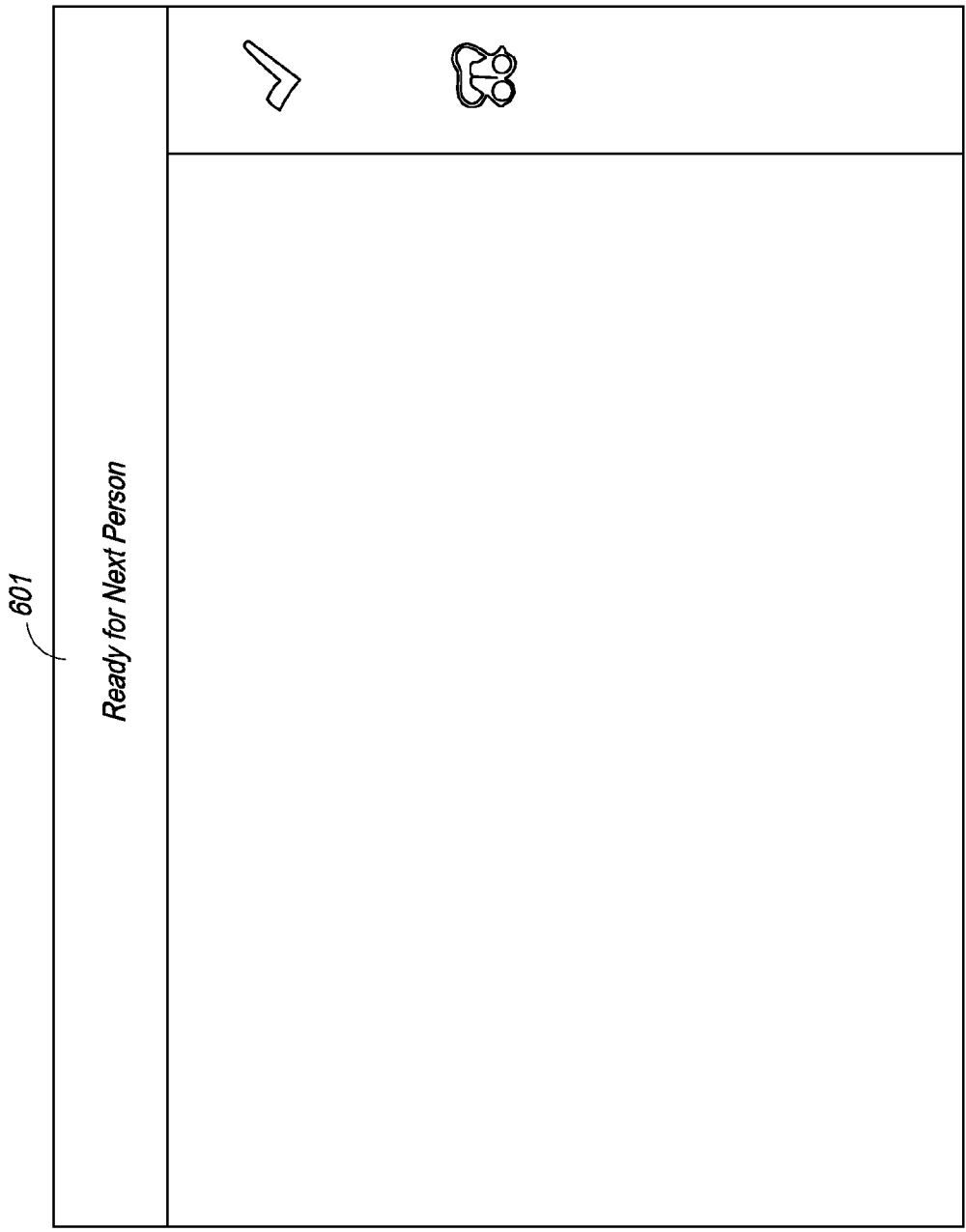

As shown in FIG. 6S, once the inspection is complete, the image analyst selects the "Search Complete" button 614 (which was originally "search" button 614) in step 723 and the imaging system is readied for the next person. The monitor 106 displays status message 601 "Ready for Next Person . . . " upon this action, as shown in FIG. 6T.

Figure 6U:
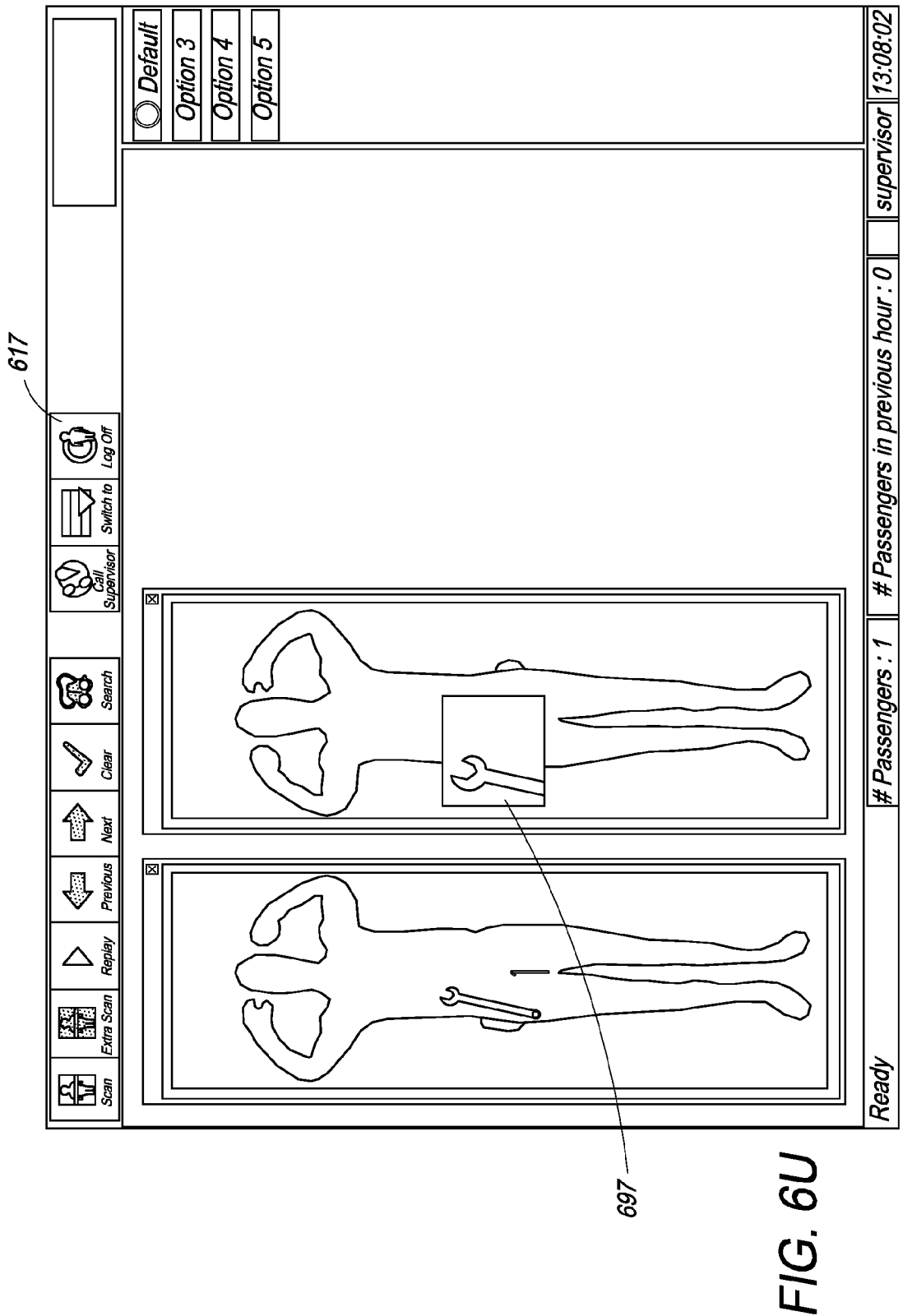

As shown in FIG. 6U, in one embodiment, a zoom feature an also be used by the image analyst to resolve smaller objects 697 or bypass reduction in details when using privacy settings.

In one embodiment, in step 725, log-off button 617 enables security personnel to exit the graphical user interface of the security system and stops the scanning and inspection system.

The present invention may be used, but is not limited to, screening passengers at airports, railway stations, shopping malls, and even in medical applications.

Although specific reference has been made to a subject being in standing position during a scanning procedure, horizontal scanning is equally possible with the person lying down on a table.

The above examples are merely illustrative of the many applications of the system of present invention. Although only a few embodiments of the present invention have been described herein, it should be understood that the present invention might be embodied in many other specific forms without departing from the spirit or scope of the invention. Therefore, the present examples and embodiments are to be considered as illustrative and not restrictive, and the invention may be modified within the scope of the appended claims.

I claim:

1. An imaging system for inspecting a human body, wherein said imaging system comprises a plurality of programmatic instructions stored in non-volatile memory and wherein, upon execution of said plurality of programmatic instructions by at least one processor, said system:
   generates at least one first image of said human body;
   receives data indicative of a plurality of physical dimensions of the human body, wherein said data is generated by measuring at least three points on different locations on the human body;
   identifies a location of at least one region of interest that requires further inspection;
   modifies said location of the at least one region of interest with respect to said at least one first image using said data; and
   generates at least one second image wherein said at least one second image is a visual representation of the at least one region of interest having said modified location and said at least one first image.

2. The imaging system of claim 1 further comprising a first display adapted to display said at least one first image.

3. The imaging system of claim 2 further comprising an inspector station, wherein the first display is located at the inspector station for viewing by an image analyst.

4. The imaging system of claim 2 further comprising a second display adapted to display said at least one second image.

5. The imaging system of claim 4 wherein the first display is remote from the second display and wherein scan information displayed at the first display is communicated to the second display.

6. The imaging system of claim 1 wherein the at least three points includes at least one point indicative of a height of the human body.

7. The imaging system of claim 6 wherein the at least three points includes at least one point indicative of a left point on the human body.

8. The imaging system of claim 6 wherein the at least three points includes at least one point indicative of a right point on the human body.

9. The imaging system of claim 1 wherein the at least one first image is modified to preserve privacy of the human body.

10. The imaging system of claim 1 wherein, upon execution of said programmatic instructions by the at least one processor, said system receives an input from an image analyst and, based on said input, annotates a region of interest on said at least one first image.

11. The imaging system of claim 10 wherein said annotation comprises a suitable indicator for communicating a perceived threat region of interest.

12. The imaging system of claim 1 wherein the at least one first image is re-sized, re-shaped, or re-positioned to correlate to a scale of an actual body size of the human body to generate the at least one second image.

13. An X-ray backscatter imaging system for inspecting a human body comprising:
   a radiation source adapted to produce a pencil beam of X-rays toward an imaging area;
   a detector array for detecting X-rays that are backscattered from the pencil beam as a result of interacting with the human body positioned in said image area; and
   an image processing system, wherein said image processing system is adapted to generate at least one first image of said human body;
   receive data indicative of a plurality of physical dimensions of the human body, wherein said data is generated by measuring at least three points on different locations on the human body;
   identify a location of at least one region of interest that requires further inspection;
   modify said location of the at least one region of interest with respect to said at least one first image using said data; and
   generate at least one second image wherein said at least one second image is a visual representation of the at least one region of interest having said modified location and said at least one first image.

14. The X-ray backscatter imaging system of claim 13 further comprising an inspector station and a first display, wherein the first display located at the inspector station remote from said radiation source.

15. The X-ray backscatter imaging system of claim 14 further comprising a second display located proximate the radiation source, wherein scan information on said first display is communicated to said second display.

16. The X-ray backscatter imaging system of claim 13 wherein the at least three points includes at least one point indicative of a height of the human body.

17. The X-ray backscatter imaging system of claim 16 wherein the at least three points includes at least one point indicative of a left point on the human body.

18. The X-ray backscatter imaging system of claim 16 wherein the at least three points includes at least one point indicative of a right point on the human body.

* * * * *